United States Patent [19]

Muramatsu et al.

[11] Patent Number: 5,136,313
[45] Date of Patent: Aug. 4, 1992

[54] FILM INITIAL-ADVANCE APPARATUS FOR CAMERA

[75] Inventors: Katsuji Muramatsu, Tokyo; Yasuhiko Tanaka; Hiroshi Nakamura, both of Saitama; Mashasi Takamura, Tokyo, all of Japan

[73] Assignee: Fuji Photo Film Co., Ltd., Kanagawa, Japan

[21] Appl. No.: 585,014

[22] Filed: Sep. 14, 1990

[30] Foreign Application Priority Data

| Sep. 14, 1989 | [JP] | Japan | 1-238788 |
| Oct. 11, 1989 | [JP] | Japan | 1-118919[U] |
| Oct. 11, 1989 | [JP] | Japan | 1-264430 |
| Oct. 13, 1989 | [JP] | Japan | 1-267917 |
| Oct. 20, 1989 | [JP] | Japan | 1-273468 |

[51] Int. Cl.⁵ .......................... G03B 1/18; G03B 1/00
[52] U.S. Cl. ........................... 354/173.1; 354/212
[58] Field of Search ............... 354/171, 172, 173.1, 354/173.11, 21, 212; 242/71, 71.1, 71.2

[56] References Cited

U.S. PATENT DOCUMENTS

| 4,397,535 | 8/1983 | Harvey | 354/212 |
| 4,416,525 | 11/1983 | Chan | 354/214 |
| 4,505,562 | 3/1985 | Hara et al. | 354/212 |
| 4,564,279 | 1/1986 | Sitzler et al. | 354/214 |

FOREIGN PATENT DOCUMENTS 746925 3/1956 United Kingdom.

*Primary Examiner*—Russell E. Adams
*Assistant Examiner*—Jae N. Noh
*Attorney, Agent, or Firm*—Young & Thompson

[57] ABSTRACT

A film initial-advance apparatus advances, after a film cassette is loaded, a film leader portion protruding from the film cassette toward a film take-up spool. A drive lever moves as the film take-up spool rotates. The drive lever causes a film threading member to reciprocally and intermittently move along a film passageway. The film threading member engages with a perforation of the film leader portion to intermittently advance the film leader portion. When the film leader portion is fully captured by the film take-up spool, the drive lever is pushed outside in the axial direction of the film take-up spool by the side edge of the film leader portion, thereby disengaging the drive lever from the film take-up spool. The film threading member rotates while moving in the radial direction, having a large radius of rotation of the claw over the range wherein it engages a perforation of the film leader portion and a smaller radius elsewhere.

13 Claims, 18 Drawing Sheets

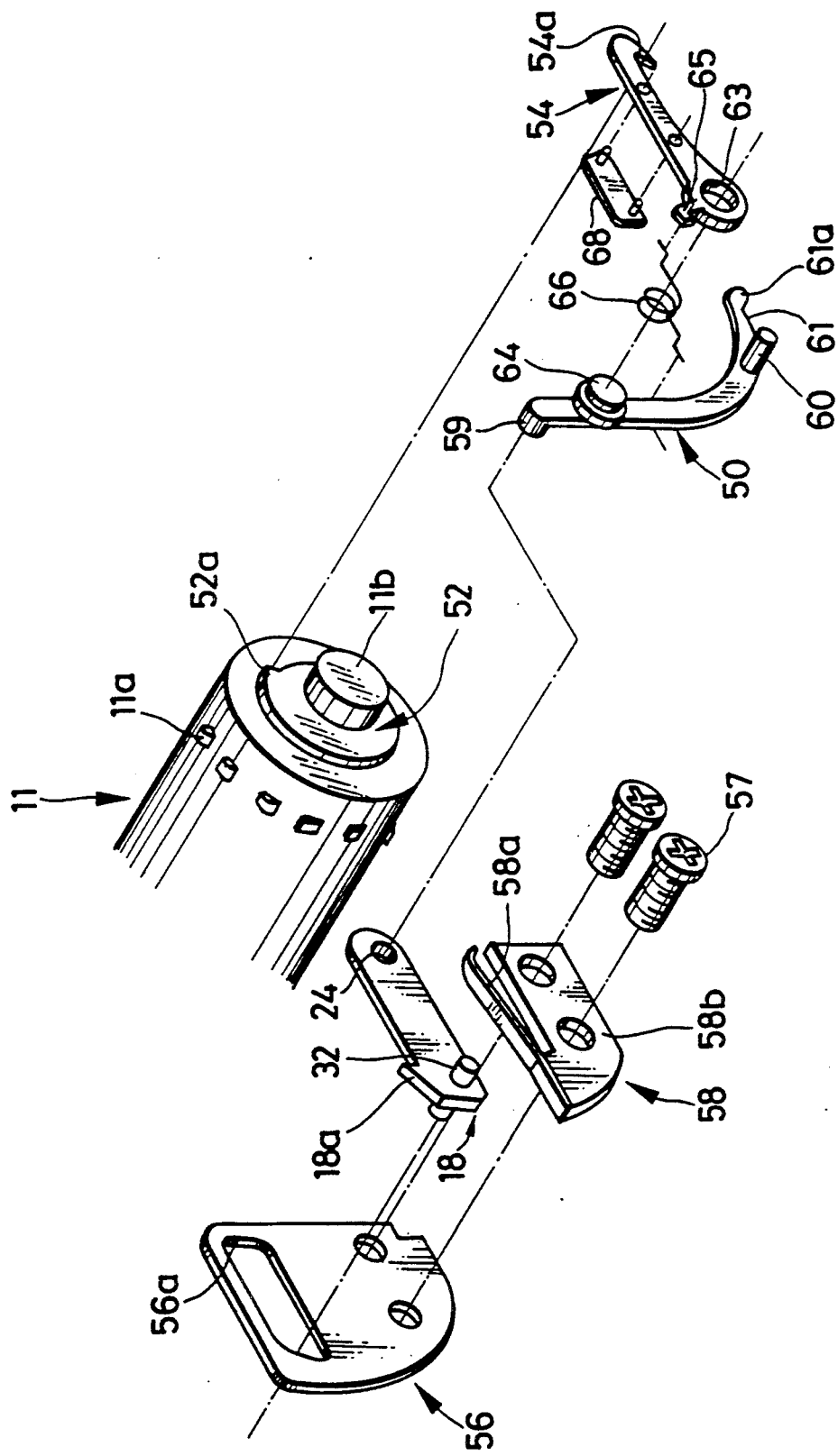

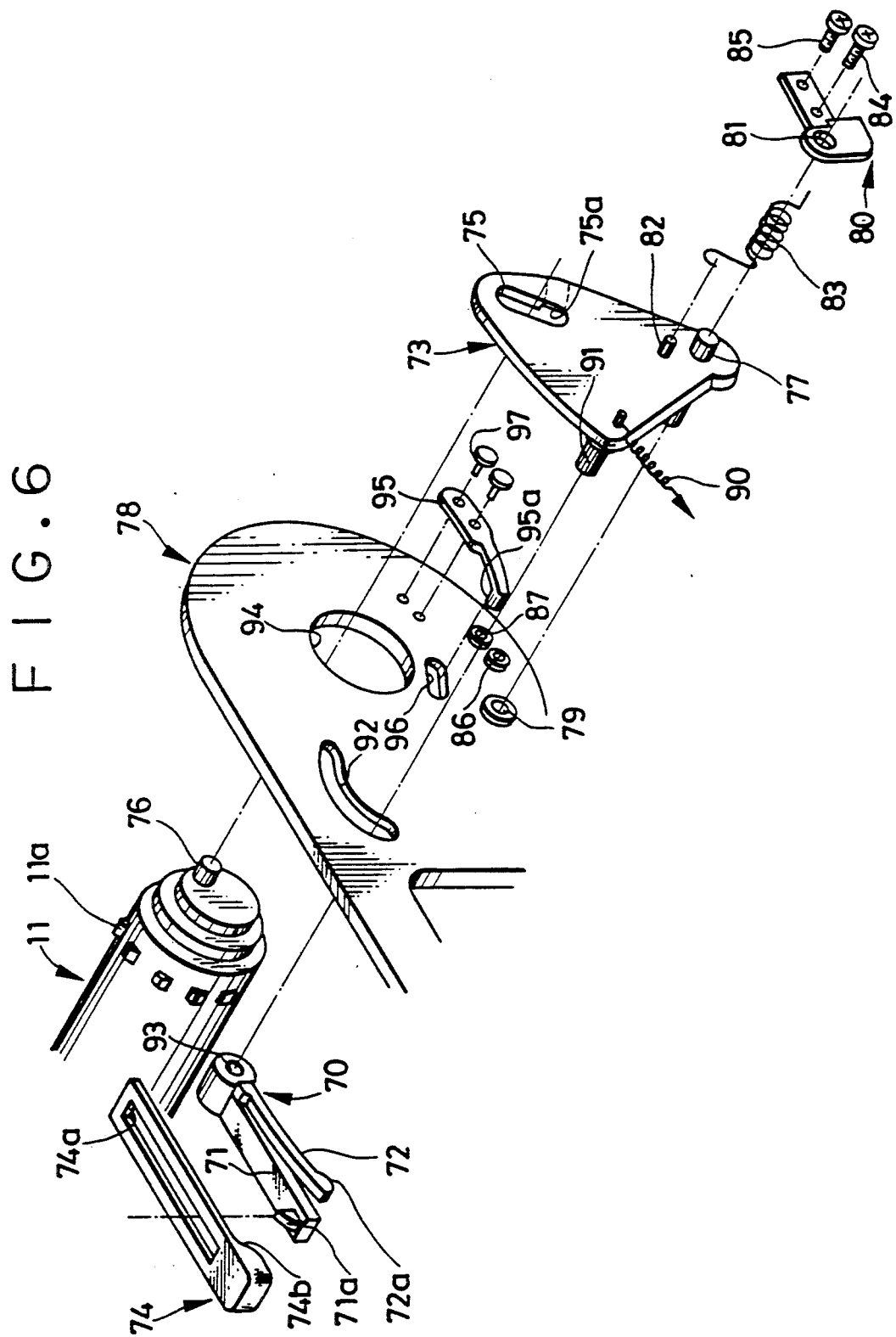

FILM INITIAL-ADVANCE APPARATUS FOR CAMERA

BACKGROUND OF THE INVENTION

The present invention relates to an automatic film loading camera, and more particularly to a film initial-advance apparatus for advancing a film leader portion extending from a film cassette toward a film take-up chamber until the film leader portion is captured by a take-up spool within the film take-up chamber.

Compact cameras of the drop-in loading type having a simple film loading function are now on the market. When the back door of a camera of this type is opened, a cassette inlet is exposed at the bottom of the camera body. A slit is also opened, between the camera body and the back door, into which a film leader portion extending from the film cassette is inserted. As a film cassette is inserted in the axial direction via the cassette inlet into the camera body, the film leader portion is slid via the slit into the camera body and positioned in the film passageway. With such a camera, it is not necessary manually to advance the end of the film leader portion within the film take-up chamber, but it is necessary to conduct an initial advance of the film whereby the film leader portion is reliably captured by the film take-up spool within the film take-up chamber.

A conventional film initial-advance apparatus, as disclosed for example in Japanese Utility Model Laid-open Publ. No. 61-61532, has a film threading member disposed adjacent an exposure frame. A claw or tooth formed on the outer periphery of the film threading member projects into the film passageway. This film threading member is powered by a drive via a one-way clutch and a gear train, the drive also rotating the film take-up spool within the film take-up chamber. When a film cassette is loaded into the film supply chamber and the back door is closed, then the film initial-advance apparatus starts operating. As the claw of the film threading member engages with a perforation in the film leader portion, the film leader portion advances toward the film take-up chamber. When the film leader portion reaches the film take-up spool, perforations of the film leader portion are captured by a plurality of capture members formed on the outer periphery of the film take-up spool. After the film leader portion is completely captured around the film take-up spool by the film initial advance, the film is transported by the film take-up spool because the speed of film advance due to the film take-up spool is higher than that due to the film threading member.

When the film is advanced by the driving force of the spool, the film threading member can be driven in rotation by the film thanks to the one-way clutch so as not to hinder the film advance.

It is also known in the art to provide that a claw of the film threading member is retracted from the film passageway after the film initial advance, so as not to hinder film rewinding.

In recent compact cameras, there has been a tendency to provide a sophisticated function by using as a taking lens a dual-focal-length changeable lens or a zoom lens. Such a taking lens has many lens elements and is large in size. In order to make the size of a camera small when it is not used, it is preferable to retract the taking lens within the camera body to the extent that the rear end of the taking lens is adjacent the exposure frame. However, the film initial-advance apparatus is mounted near the exposure frame so that the taking lens should be in a position spaced from the film initial-advance apparatus. One of the improvements in making a camera compact is therefore to reserve a space for the taking lens near the exposure frame near which the film initial-advance apparatus is mounted.

Referring again to the initial film advance operation, the film leader portion is intermittently advanced as the claw of the film threading member repeatedly engages with and disengages from successive perforations. Accordingly, if the radius of rotary motion of the claw is small, it becomes difficult for the claw to disengage from a perforation. If disengagement does not occur, the claw continues to wind the film so that proper film advance becomes impossible. In view of this, a conventional film threading member has a large diameter. Accordingly, if the film threading member can be made compact while at the same time eliminating the problem of claw disengagement, there would be a great advantage from the viewpoint of saving space for the taking lens near the exposure frame.

Furthermore, a conventional film initial-advance apparatus requires a gear train for the transmission of torque to the one-way clutch and film threading member, which has a tendency to increase the number of components and complicate the structure.

OBJECTS OF THE INVENTION

It is therefore a principal object of the present invention to provide a film initial-advance apparatus for a camera that requires only a small space in the direction of the taking lens optical axis.

It is another object of the present invention to provide a film initial-advance apparatus for a camera, with a simple structure.

It is a further object of the present invention to provide a film initial-advance apparatus for a camera capable of providing a sufficient radius of rotary motion of a claw of a film threading member on the film passageway while at the same time reducing the space necessary for the rotation of the film threading member.

SUMMARY OF THE INVENTION

In order to achieve the above and other objects and advantages of this invention, a drive means for advancing a film leader is coupled intermittently to a film take-up spool until the film leader is captured by the film take-up spool. A film threading member coupled to the drive means reciprocates parallel to the direction of feeding the film. In an early stage of the motion of the film threading member, it causes a claw to project into the film passageway and to engage with a perforation of the film leader. By then moving the claw along the film passageway, the film leader is intermittently advanced toward the film take-up spool.

According to a preferred embodiment of this invention, after the film leader is captured by the film take-up spool, the side edge of the film leader causes the drive means to shift in the axial direction of the film take-up spool so that drive means disengages from the film take-up spool. The drive means is provided with a cam mechanism and a coupling mechanism by which it can couple to the film take-up spool intermittently. The coupling mechanism is comprised by a hook integral with or separate from the drive lever, that engages with a projection or engaging member of the film take-up spool. After the film take-up spool rotates through a predetermined angle, this engagement is released until the next stroke.

The film threading member is reciprocated by the film take-up spool, thereby providing a simple structure and a compact arrangement in the axial direction of a taking lens.

According to another embodiment, there is used a rotatable film threading member. The film threading member rotates while sliding along a straight line interconnecting the center of rotation and a claw. The rotary radius of the film threading member therefore becomes large near the film passageway and smaller elsewhere, thus reducing considerably the space required for the rotation of the film threading member.

BRIEF DESCRIPTION OF THE DRAWINGS

The above and other objects and advantages of the present invention will become apparent from the following detailed description of preferred embodiments when read in connection with the accompanying drawings, in which:

FIG. 4 is an exploded perspective view showing another embodiment of this invention wherein a drive lever and a hook lever are formed discretely;

FIG. 6 is an exploded perspective view showing another embodiment using a cam mechanism according to this invention;

DETAILED DESCRIPTION OF THE PREFERRED EMBODIMENTS OF THE PRESENT INVENTION

Figure 1:
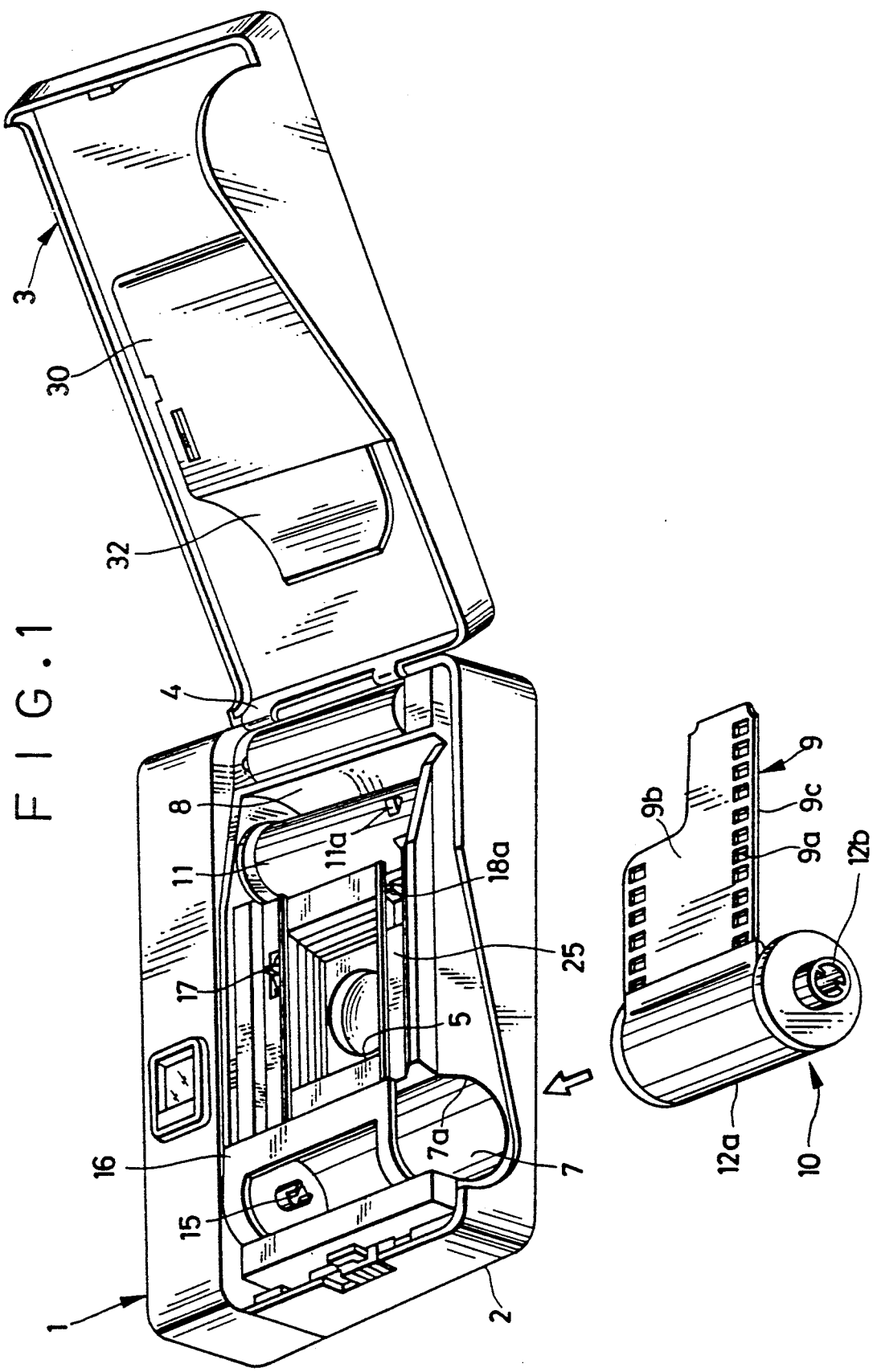
FIG. 1 is a perspective view showing a drop-in loading camera incorporating a film initial-advance apparatus of this invention.

FIG. 1 shows a drop-in loading camera 1 with its back door opened wider than the actual film loading position in order to show the inside in detail. The back door 3 is pivotably coupled to the camera body 2 by a hinge 4. An exposure frame 5 defining an exposure area of one frame is formed at the center of and inside the camera body 2. On lateral sides of the exposure frame 5, there are provided a film supply chamber 7 and a film take-up chamber 8. A film cassette 10 is to be loaded into the film supply chamber 7. The film cassette 10 is composed of a cassette 12a, a spool 12b rotatably housed within the cassette 12a, and a 35 mm roll film 9 coiled on the spool 12b. The film supply chamber 7 is formed with a film rewinding shaft 15 projecting within the chamber and used for rotating the spool 12b of the film cassette 10 when the film is rewound. An inlet 7a used for loading the film cassette 10 is formed in the bottom of the film cassette 10 which inlet is exposed when the back door 3 is open. At the back of the film supply chamber 7, there is provided a plate 16 which regulates the position of the film cassette 10. In the film take-up chamber 8, there is rotatably mounted a film take-up spool 11 for winding up the film 9. A motor 13 (refer to FIG. 2) is housed within this spool 11.

There is mounted above the exposure frame 5a a free sprocket 17 which is used for detecting the feed amount of the film 9 by engaging with perforations 9a of the film 9 and rotating accordingly as the film 9 is transported. Under the exposure frame 5, a claw 18a of a film threading member 18 (refer to FIG. 2) is located. The claw 18a engages with a perforation 9a of a film leader portion 9b. Although the claw 18a is shown in FIG. 1 as projecting above a film guide surface 25, it is retracted from the film guide surface 25 when a film is loaded, preventing the insertion of the film leader portion 9b from being hindered by the claw 18a. A plurality of capture members 11a of saw-tooth shape are formed on the outer periphery of the film take-up spool 11 at its one end portion for engaging with perforations 9a of the film 9. At the center and inside of the back door 3, there is mounted a film pressure plate 30 for pressing the film 9 on the film guide surface 25, a film passageway 19 (shown in FIG. 11A) being defined between the exposure frame and the film pressure plate. Reference numeral 32 represents a film guide plate which guides the end of the film leader portion entering the film take-up chamber 8 along the outer periphery of the film take-up spool 11.

Figure 2:
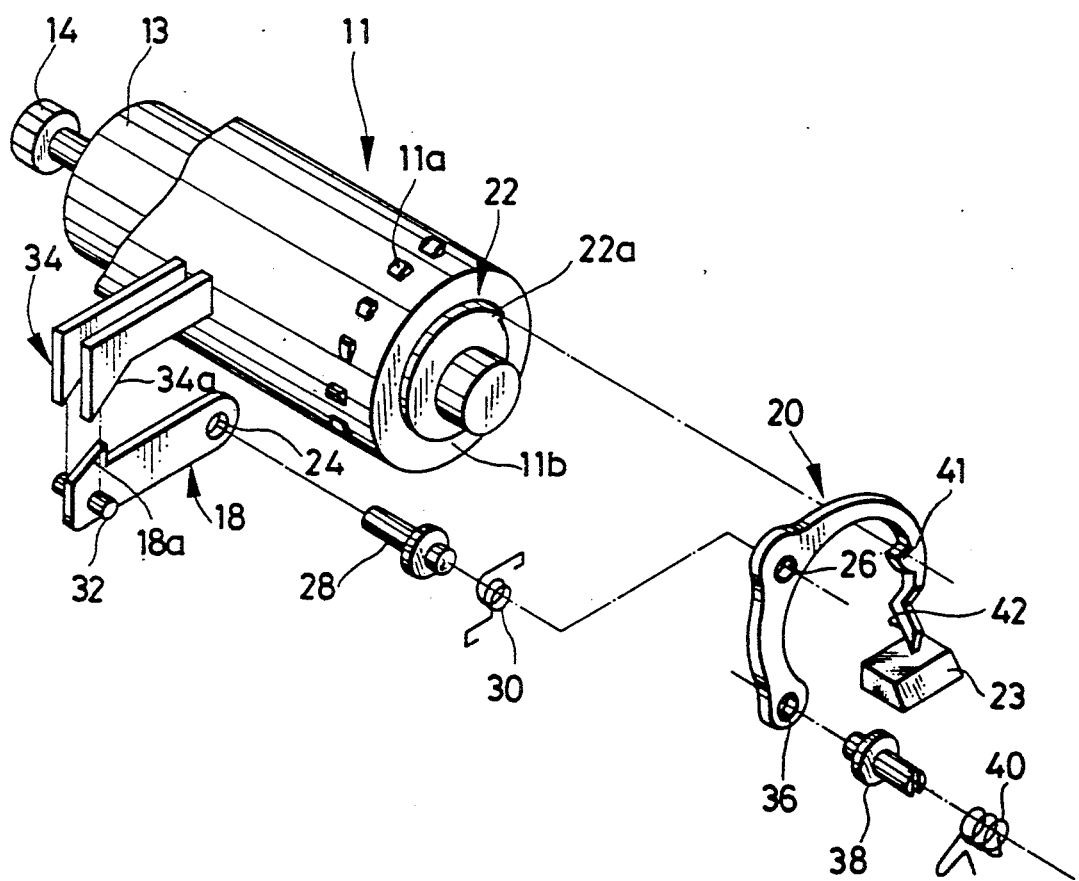
FIG. 2 is an exploded perspective view showing an embodiment of the film initial-advance apparatus of this invention.

Referring to FIG. 2, the film initial-advance apparatus is comprised by a film threading member 18 having the claw 18a, a drive lever 20 for driving the film threading member 18, a spool cam 22 fixed to an end surface 11b of the film take-up spool 11, a tapered member 23 that provides a stationary cam, formed within the film take-up chamber 8, and a spring 40 for biassing the drive lever 20. The film threading member 18 is formed at one end portion with a hole 24 for coupling to the drive lever 20. A coupling pin 28 is inserted in the hole 24 and a hole 26 formed in the drive lever 20. The coupling pin 28 is provided with a spring 30 which exerts torque on the film threading member 18 in the clockwise direction.

Two guide plates 34 are disposed on opposite sides of the film threading member 18. A guide pin 32 of the film threading member 18 is in contact with the lower surface of the two guide plates 34 thereby to guide the film threading member 18. An inclined portion 34a is formed on each guide plate 34 so that the claw 18a is prevented from projecting above the film guide surface 25 during the stand-by state of the film threading member 18. The generally arcuate drive lever 20 causes the film threading member 18 to reciprocate due to the torque of the film take-up spool 11. On the drive lever 20 is formed at its one end portion a hole 36 into which a rotary shaft 38 slidably supported by the camera body 2 is inserted. The rotary shaft 38 is provided with a spring 40 to bias the drive lever 20 in the counterclockwise direction.

A hook 41 is formed on the inner portion of the drive lever 20. When the spool cam 22 rotates in the clockwise direction as viewed in FIG. 2, the hook 41 remains engaged with engaging portion 22a of the spool cam 22 so that the drive lever 20 rotates a predetermined amount as the film take-up spool 11 rotates. The distal end portion 42 of the drive lever 20 is deflected from the plane of lever 20. When the distal end portion 42 contacts the tapered member 23, the drive lever 20 is cammed along the rotary shaft 38 so that the hook 41 of the drive lever 20 disengages from the engaging portion 22a of the spool cam 22. As a result, the drive lever 20 is returned in the counterclockwise direction by the force of the spring 40 to its initial position.

The operation of this embodiment will be described next with reference to FIGS. 3A and 3B, in which the pressure plate 30 is omitted. For loading a film in the camera 1, the back door 3 is opened to the film loading position. In this state, the cassette inlet 7a is exposed and a slit is formed between the camera body 2 and the back door 3. As the film cassette 10 is inserted via the cassette inlet 7a into the film supply chamber 7 in the direction of the axis of the film cassette 10, the film leader portion 9b protruding from the film cassette 10 is guided via the slit into the film passageway 19. When the film cassette 10 is completely housed within the film supply chamber 7, the spool 12b couples with the film rewinding shaft 15. When the back door 3 is closed, a back door detector switch (not shown) is closed to activate the motor 13 to rotate the film take-up spool 11. The rotation of an output shaft of the motor 13 is transmitted to the film take-up spool 11 and reduced in speed via the drive gear 14 and a known gear train (not shown).

Figure 3A:
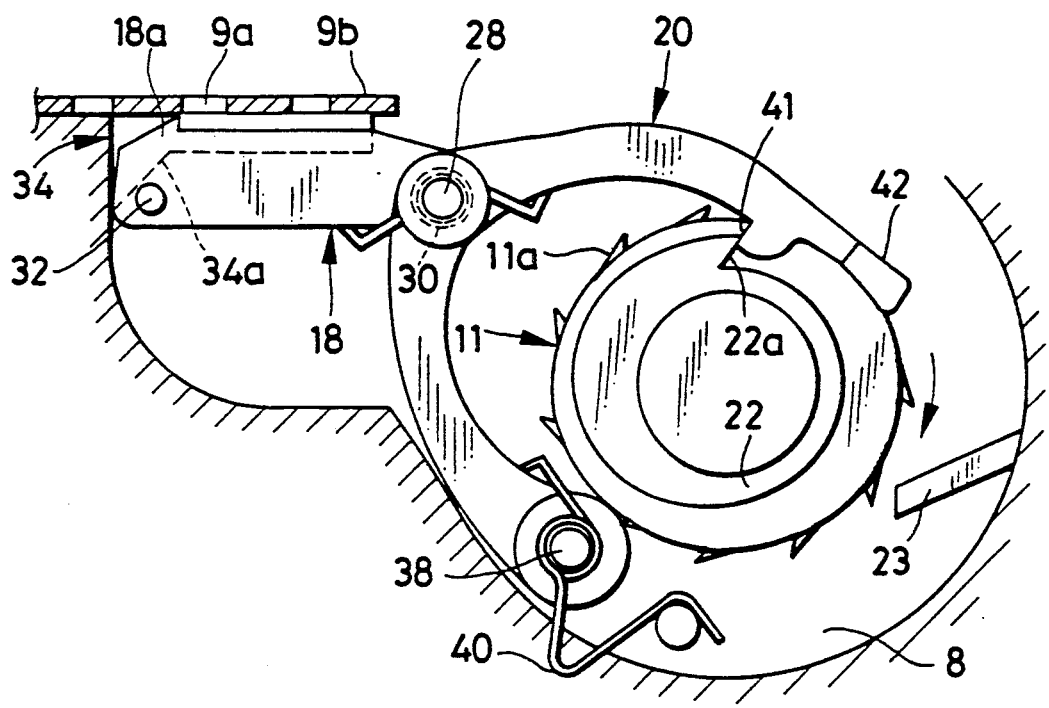
FIGS. 3A and 3B illustrate the operation of the embodiment shown in FIG. 2, FIG. 3A illustrating the state before the claw of the film threading member engages with a perforation and FIG. 3B illustrating the state wherein the film leader portion is being advanced.

As the film take-up spool 11 is rotated in the clockwise direction by the motor 13, the engaging portion 22a of the spool cam 22 engages with the hook 41 of the drive lever 20 as shown in FIG. 3A. At this time, the guide pin 32 of the film threading member 18 is in contact with the inclined portions 34a of the guide plates 34 so that the claw 18a remains retracted from the film guide surface 25. As the film take-up spool 11 further rotates, the drive lever 20 following the take-up spool 11 rotates in the clockwise direction about the rotary shaft 38. Therefore, the film threading member 18 moves toward the film take-up chamber 8 while guided by the guide plates 34, as shown in FIG. 3B. As the threading member 18 moves and the guide pin 32 leaves the inclined portion 34a, the claw 18a projects above the film guide surface 25 so that it engages with a perforation 9a of the film leader portion 9b to transport the film leader portion 9b toward the film take-up chamber 8.

When the distal end 42 of the drive lever 20 comes into contact with the tapered member 23, the drive lever 20 is pushed in a direction perpendicular to the drawing sheet, toward the viewer, along the rotary shaft 38. As a result, the hook 41 of the drive lever 20 disengages from the engaging portion 22a of the spool cam 22 so that the drive lever 20 is rotated in the counterclockwise direction by the force of the spring 40 and returns to its initial position. During this operation, the claw 18a slides under the stopped film 9. When the film take-up spool 11 has made one rotation, the drive lever engages again with the spool cam 22 and the film threading member 18 once more advances in the manner described above. The film threading member 18 thus reciprocates repeatedly, thereby intermittently to advance the film leader portion 9b toward the film take-up chamber 8. The film leader portion 9b, having reached the film take-up chamber 8, is guided onto the outer periphery of the film take-up spool 11 by the film guide plate 32.

Figure 3B:
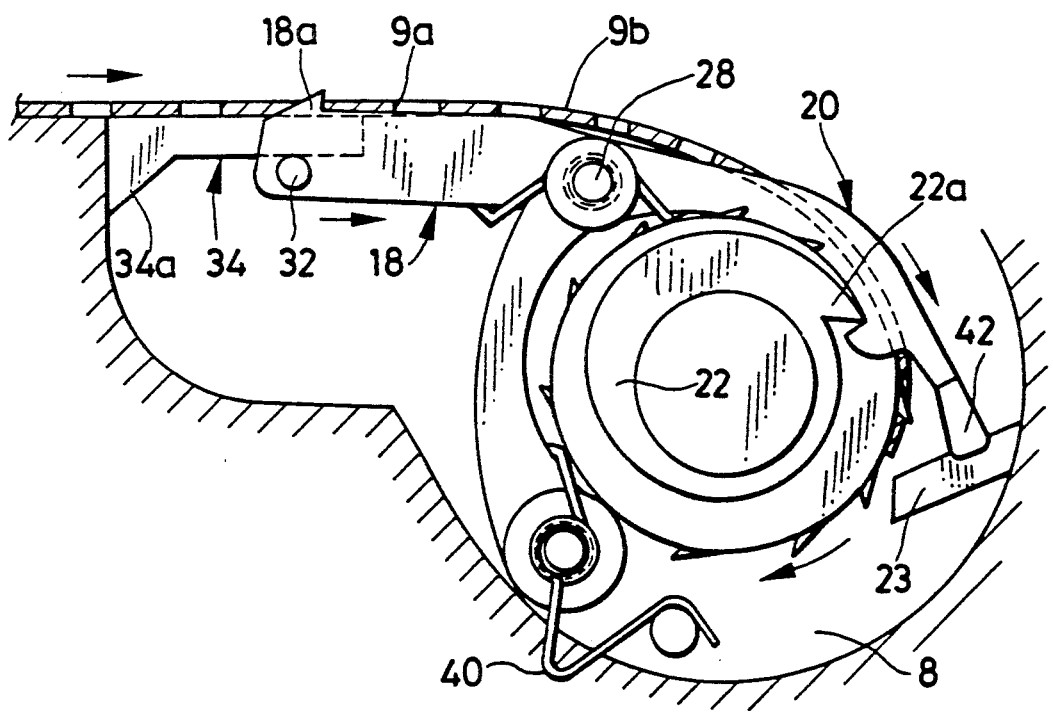

As shown in FIG. 3B, when the film leader portion 9b reaches the film take-up spool 11, perforations 9a engage with the capture members 11a of the film take-up spool 11 to wind the film leader portion 9b about the film take-up spool 11. The capture members 11a can capture the perforations reliably because this capture operation is carried out while the film leader portion 9b remains stationary between the intermittent advances of the film leader portion 9b under the influence of the film threading member 18.

After the film leader portion 9b is captured by the film take-up spool 11, the side edge portion 9c of the film leader portion 9b pushes against the adjacent side surface of the drive lever 20. As a result, the drive lever 20, in the initial position shown in FIG. 3A, moves once more perpendicular to the plane of the drawing sheet, toward the viewer, against the force of the spring 40, and the drive lever 20 is thus displaced from a position wherein the spool cam 22 can engage therewith. It should also be noted that, when the film leader portion 9b is captured by the film take-up spool 11 while the drive lever 20 is in the course of being moved by the rotating film take-up spool 11, the drive lever 20 is thus deflected along the rotary shaft 38 so that the spool cam 22 disengages from the drive lever 20. The drive lever 20 then rotates in the counterclockwise direction due to the torque of the spring 40. The threading member 18 returns to the initial position as shown in FIG. 3A. The claw 18a is retracted from the film guide surface 25. Thereafter, the hook 41 will be held retracted from the path of the spool cam 22 by the edge portion 9c, until the film leader portion 9b is again released from captivity on the film take-up spool 11 by the film rewinding operation to be described later.

After the initial film advance, the film 9 is transported by the rotation of the film take-up spool 11 to position the first frame in the exposure frame 5. A release button (not shown) is actuated to open the shutter and expose the first frame. After this exposure, the motor 13 rotates to wind the film 9 about the film take-up spool 11 by one frame. After all frames are exposed, the film 9 will not further be pulled out from the film cassette 10. In this state, an increase of tension in the film is detected by a known torque detecting mechanism (not shown) and the motor circuit (not shown) is set to the film rewinding mode.

In the film rewinding mode, the motor 13 rotates in the reverse direction to cause the spool 12b of the film cassette 10 to rotate by means of the film rewinding shaft 15. As the spool 12b rotates, the exposed film 9 is rewound into the film cassette 10 and the moving film 9 causes the film take-up spool 11 to rotate. During film rewinding, the adjacent side surface of the drive lever 20 remains in contact with the side edge 9c of the film 9 and so remains disengaged from the spool cam 22. When the film leader portion 9b is detached from the film take-up spool 11, the film take-up spool 11 stops rotating. Then, the drive lever 20 is released by edge portion 9c and is pushed back toward the film take-up spool 11 by the force of the spring 40 to allow the drive lever 20 to engage once more with the spool cam 22, thereby to prepare the mechanism for the next film initial advance. The motor 13 stops when the exposed film 9 has been fully wound into the film cassette 10.

Figure 5A:
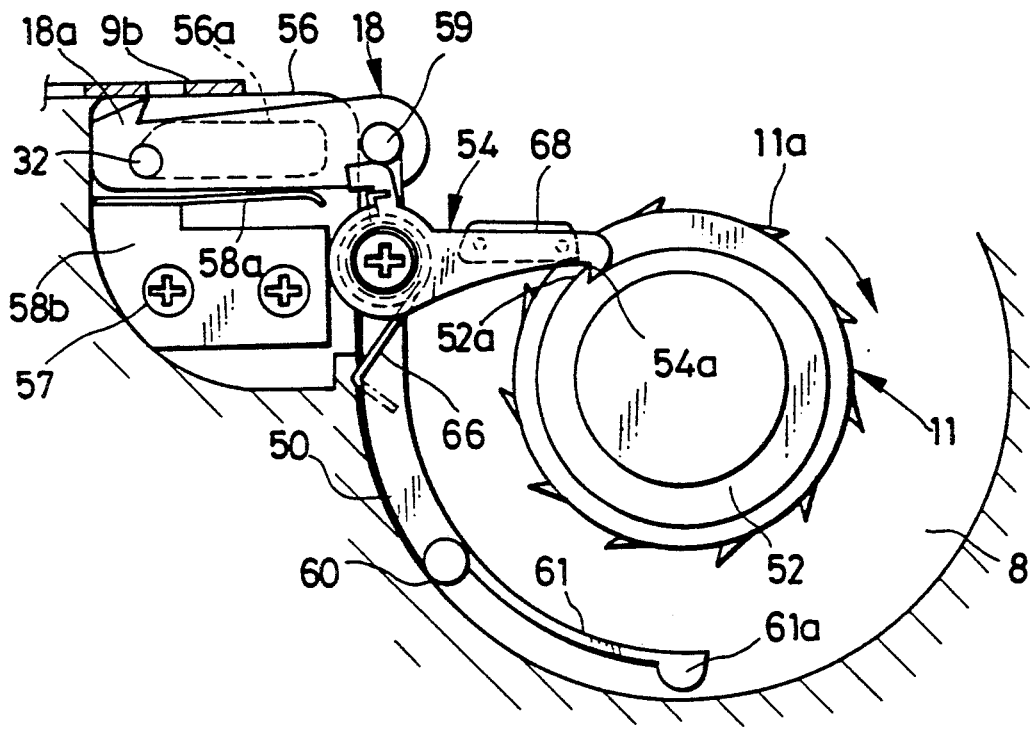
FIGS. 5A and 5B illustrate the operation of the embodiment shown in FIG. 4 in the same way as FIG. 3.
Figure 5B:
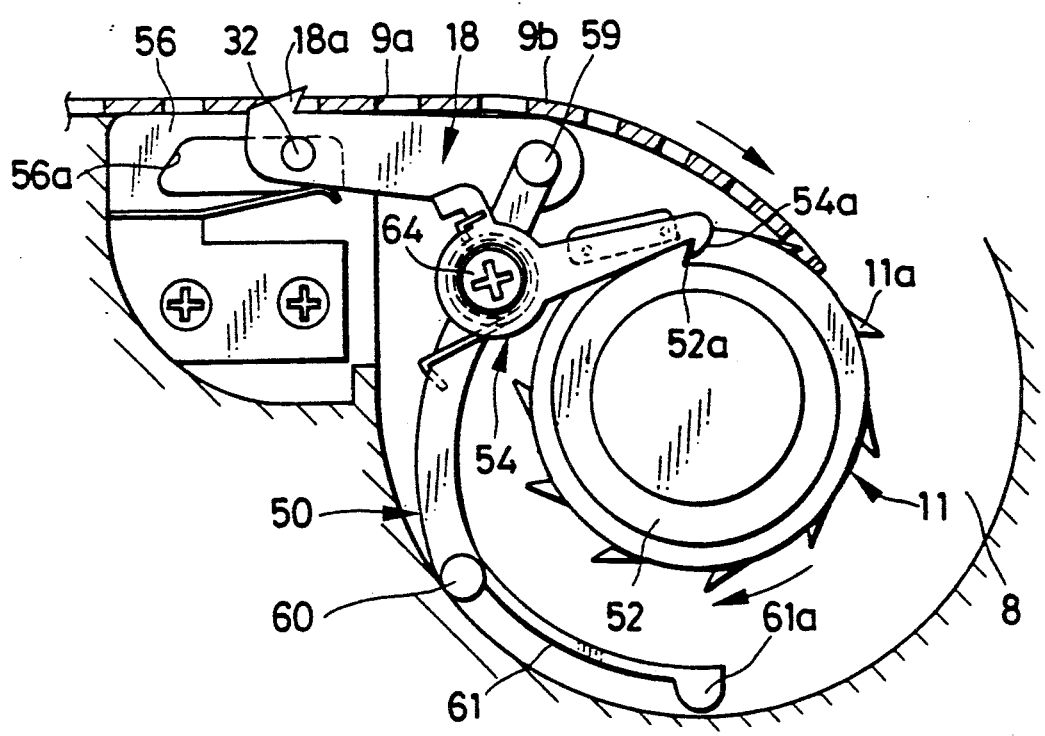

FIGS. 4, 5A and 5B show an embodiment wherein a hook lever is provided as a discrete element in addition to the drive lever, and the hook lever is arranged to disengage smoothly and naturally from the spool cam. Elements similar to those of the above-described embodiment are represented using identical reference numerals. In FIG. 4, the film initial-advance apparatus is comprised by a film threading member 18, a drive lever 50 for driving the film threading member 18, a spool cam 52, a hook lever 54 coupled between the spool cam 52 and drive lever 50, and a film side edge detecting member 68. A base plate 56 for guiding the film threading member 18 is formed with a guide hole 56a in which a guide pin 32 is received. As the film threading member 18 moves toward the film take-up chamber 8, the guide pin 32 moves along the upper inner surface of the guide hole 56a. An inclined portion is formed at the left side of the guide hole 56a so that the claw 18a does not project into the film guide surface 25 when the film threading member 18 is retracted. Below the film threading member 18, there is disposed a spring assembly 58 fixed on the base plate 56 by means of two screws 57. This spring assembly 58 is comprised by a leaf spring 58a for continuously biassing the film threading member 18 upward, and a base plate 58b for supporting the leaf spring 58a in cantilever fashion.

The drive lever 50 is made of spring material. The lower portion of the drive lever 50 is formed in an arcuate shape to match the inner wall of the film take-up chamber 8. There is formed at the upper end of the drive lever 50 a pin 59 which is inserted in a hole 24 of the film threading member 18. A shaft 60 is fixed on the intermediate portion of the arcuate portion of the drive lever 50. The shaft 60 is rotatably supported on the camera body 2. The lower end portion 61 of the drive lever 50 is thin enough to display the characteristics of spring, and the tip of the lower end portion 61 is formed with a projection 61a. As the driver lever 50 rotates in the clockwise direction about the rotary shaft 60, the projection 61a is deflected by the inner wall of the film take-up chamber 8 to the extent necessary to store potential energy sufficient to return the drive lever 50.

The hook lever 54 is used for swinging the drive lever 50 and is formed with a hole 63 in which a pin 64 of the drive lever 50 is rotatably received. A spring 66 extends between the hook lever 54 and the pin 64 of the drive lever 50. The spring 66 has its one end coupled to a finger portion 65 of the drive lever 50 and its other end coupled to the drive lever 50, so that it biases the hook lever 54 clockwise relative to the drive lever 50. There is formed at the tip of the hook lever 54 a hook 54a which engages with the engaging portion 52a of the spool cam 52 only when the spool cam 52 rotates in the clockwise direction. On the side surface of the hook lever 54 facing the film take-up spool 11, there is mounted a film side edge detecting member 68. When the film 9 is wound about the film take-up spool 11, the film side edge detecting member 68 is pushed by the side edge 9c of the film 9 so that the hook lever 54 is moved toward the lower right as seen in FIG. 4 along the pin 64.

The operation of the embodiment shown in FIG. 4 will be described with reference to FIGS. 5A and 5B. In a manner similar to the embodiment previously described, as the film take-up spool 11 rotates in the clockwise direction, the hook 54a of the hook lever 54 engages with the engaging portion 52a of the spool cam 52 as illustrated in FIG. 5A. As the film take-up spool 11 rotates further, the rotation of the spool cam 52 is transmitted via the hook lever 54 to the drive lever 50 which in turn swings about the rotary shaft 60 in the clockwise direction. As the drive lever 50 swings, the guide pin 32 of the film threading member 18 moves, along the inclined surface of the guide hole 56a of the base plate 56, upward from the lower left thereby to project the claw 18a into the film passageway 19. The claw 18a thereafter linearly moves from the left to the right along the film passageway 19 by the coaction of the guide pin 32 and guide hole 56a as illustrated in FIG. 5B. The claw 18a moves along the film passageway 19 while being engaged with a perforation 9a of the film leader portion 9b, so that the film leader portion 9b is transported toward the film take-up chamber 8.

As the film take-up spool 11 rotates further from the position shown in FIG. 5B, the engagement of the hook 54a of the hook lever 54 with the engaging portion 52a is released naturally and smoothly. As a result, the drive lever 50 swings in the counterclockwise direction by the spring force of the lower end portion 61 to restore the initial position shown in FIG. 5A. AT this time, the claw 18a moves to the left along the lower surface of the film leader portion 9b while causing the leaf spring 58a to deflect. The claw 18a repeats the above operations so as intermittently to advance the film leader portion 9b toward the film take-up spool 11. As described previously, when the film leader portion 9b is fully captured by the film take-up spool 11, the film side edge detecting member 68 is pushed by the film side edge so that the hook lever 54 moves toward the lower right as seen in FIG. 4, along the pin 64, against the action of spring 66, and the hook lever 54 and spool cam 52 disengage. Upon disengagement of the hook lever 54 from the spool cam 52, the drive lever 50 swings in the counterclockwise direction by its own spring force and the film threading member 18 returns to the initial position as shown in FIG. 5A. Note that when the drive lever 50 takes the initial position as shown in FIG. 5A and the film leader portion 9b is captured by the film take-up spool 11, the hook lever 54 is held in an initial position retracted from the space wherein the spool cam 52 is allowed to engage therewith. As described previously, throughout film winding following the film initial advance and the film rewinding, the spool cam 52 will not engage with the hook lever 54. When the film leader portion 9b is detached from the film take-up spool 11 by the film rewinding, the film take-up spool 11 stops and the hook lever 54 is pushed toward the film take-up spool 11 by the force of the spring 66 thereby to prepare for the next film initial advance.

According to this embodiment, as the engaging portion 52a of the spool cam 52 moves downward further from the position shown in FIG. 5B during its circular motion, the hook 54a of the hook lever 54 naturally and smoothly disengages from the engaging portion 52a since the lower edge of the hook lever 4 is pushed by the peripheral surface of the spool cam 52. Therefore, the space required for the film take-up chamber 8 is reduced in the axial direction, which is advantageous for the design of cameras of reduced height. Furthermore, the hook lever 54 performs the function of a one-way clutch so that the film take-up spool can be rotated reversely by the motor during film rewinding. Still further, the component which moves during disengagement is only the hook lever 54 so that the disengagement form the film take-up spool 11 is smooth.

Figure 7A:
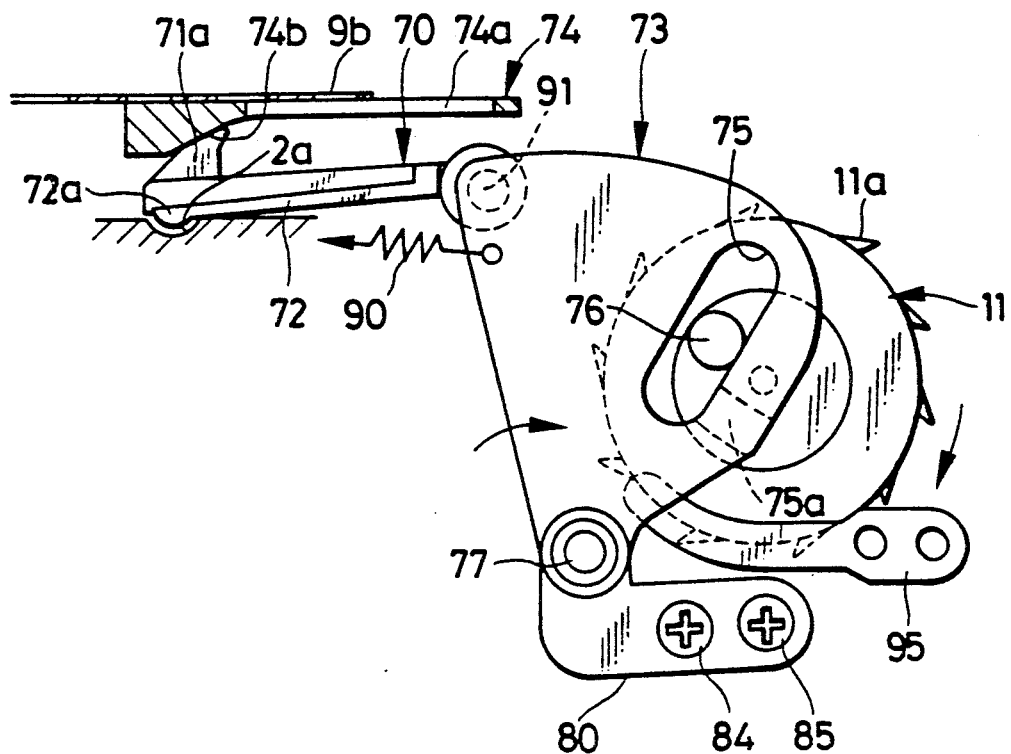
FIGS. 7A to 7C illustrate the operation of the embodiment shown in FIG. 6.

FIGS. 6 and 7A to 7C show another embodiment, wherein the film threading member is reciprocated by a cam mechanism. Elements similar to those of the previously described embodiments are represented using identical reference numerals. In this embodiment, a bifurcated film threading member 70 has two arms 71 and 72. A claw 71a is formed at the tip of the arm 71. The other arm 72 is formed in a curved shape to enjoy the characteristics of a spring and has at its tip a protrusion 72a which is adapted to fit in a recess 2a of the camera body 2 as shown in FIG. 7A.

A guide plate 74 is disposed above the film threading member 70. The claw 71a is guided by a guide slot 74a formed in the center of the guide plate 74. An inclined protrusion 74b is formed on the lower surface of the guide plate 74 at its end nearer the film supply chamber 7, in order to deflect the claw 71a below the film guide surface 25. A drive lever 73 of generally sector form has at its upper portion as seen in FIG. 6 a slot 75 in which a drive pin 76 of the film take-up spool 11 is received. A recess 75a communicating with the slot 75 is formed in the drive lever 73, the recess 75a enabling the drive pin 76 to escape from the slot 75.

At the lower portion of the drive lever 73 as seen in FIG. 6, there is mounted a shaft 77 serving as the axle of rotation of the drive lever 73. The shaft 77 is rotatably supported at its opposite end portions in a hole 79 of a base plate 78 and a hole 81 of a bearing plate 80. The base plate 78 is fixedly mounted on the camera body 2. The shaft 77 has at its one end a spring 83 whose one end is coupled to a pin 82 on the base plate 78 and the other to the bearing plate 80, thereby to bias the drive lever 73 toward the base plate 78. The bearing plate 80 is fixed to the base plate 78 by two screws 84 and 85 which are engaged in threaded holes 86 and 87. The drive lever 73 has a spring 90 for biassing it in the counterclockwise direction. A slide pin 91 of the drive lever 73 is received in a hole 93 of the film threading member 70 via an arcuate slot 92 in the base plate 78.

There are formed in the base plate 78 a bearing hole 94 in which the end portion of the film take-up spool 11 is rotatably received, and an arcuate slot 96 in which a protrusion 95a of a film side edge detecting member 95 is received. When the film side edge detecting member 95 is pushed by the side edge 9c of the film leader portion 9b, the drive lever 73 is caused to move and to remain spaced from the base plate 78. With this arrangement, connection/disconnection is controlled between the elongated slot 75 of the drive lever 73 and the drive pin 76 of the film take-up spool 11. Reference numeral 97 represents pins for fixing the film side edge detecting member 95 to the base plate 78.

Figure 7B:
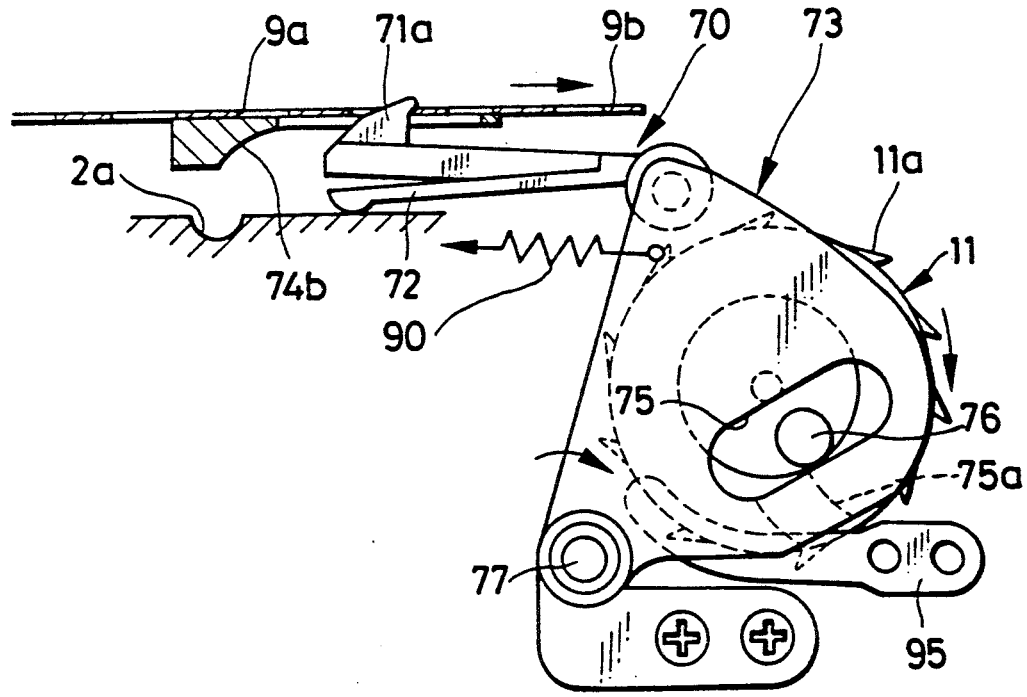
Figure 7C:
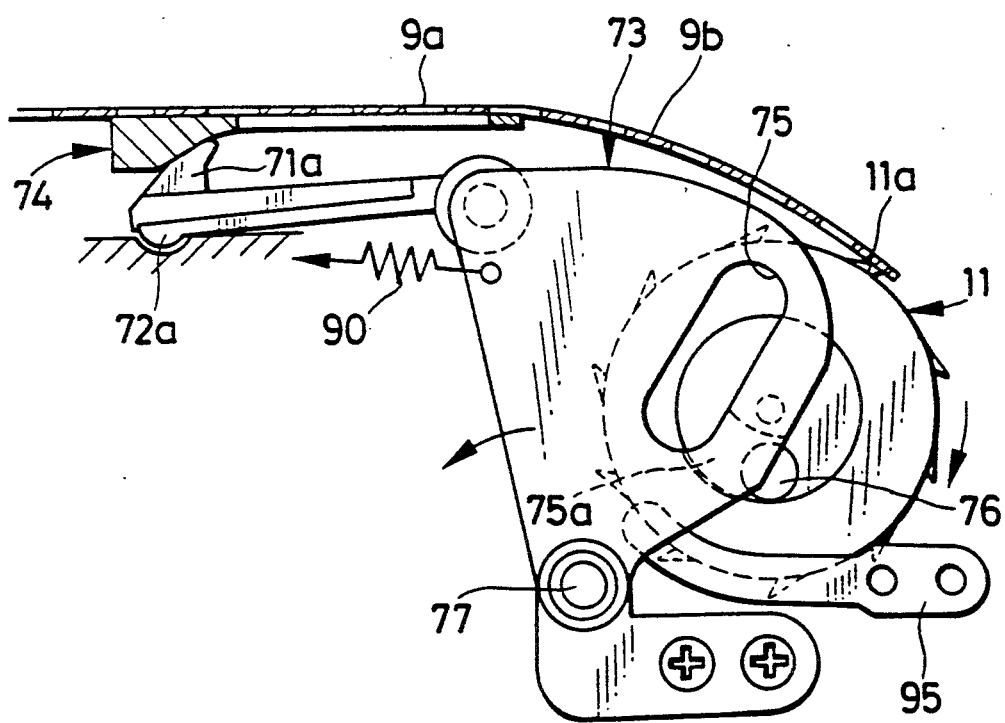

The operation of the embodiment shown in FIG. 6 will be described next with reference to FIGS. 7A to 7C. When the back door 3 is closed after loading a film, the film take-up spool 11 starts rotating in the clockwise direction as described previously. The drive pin 76 of the film take-up spool 11 enters the slot 75 via the recess 75a formed between the slot 75 and the side edge of the drive lever 73. At this initial stage, the claw 71a of the film threading member 70 is disposed under the protrusion 74b of the guide member 74, with the protrusion 72a of the guide member 72a fitted in the recess 2a. As the film take-up spool 11 and hence the drive pin 76 rotate further, the drive lever 73 swings in the clockwise direction about the shaft 77. As the drive lever 73 swings, the film threading member 70 is guided by the lower surface of the guide plate 74 and moves toward the film take-up spool 11 as shown in FIG. 7B. At this stage, the claw 71a protrudes through the guide groove 74a into the film passageway 19 to engage with a perforation 9a of the film leader portion 9b which in turn is thus advanced toward the film take-up spool 11.

After the drive pin 76 passes the position shown in FIG. 7B, it comes to the recess 75a and enters it. Accordingly, the drive lever 73 swings abruptly in the counterclockwise direction under the force of the spring 90 and moves to the position shown in FIG. 7C. In the meantime, the drive pin 76 continues its rotation, and when it again reaches the recess 75a, it reenters it, now in the reverse direction, and reenters the slot 75, thereby to return to the position shown in FIG. 7A. This sequence of operations is repeated by the drive lever 73 and the film threading member 70 thereby intermittently to advance the film leader portion 9b toward the film take-up spool 11. As described previously, when the film leader portion 9b is captured by the film take-up spool 11, the side edge 9c of the film leader portion 9b presses against the distal end 95a of the film side edge detecting member 95. As a result, the drive lever 73 is pushed toward the lower right as seen in FIG. 6, against the force of the spring 83, and rotates in the counterclockwise direction under the tension of the spring 90, so that the film threading member 70 retains the position shown in FIG. 7a. This position is maintained, as described previously, until the film leader portion 9b is detached from the film take-up spool 11 by rewinding.

Figure 8:
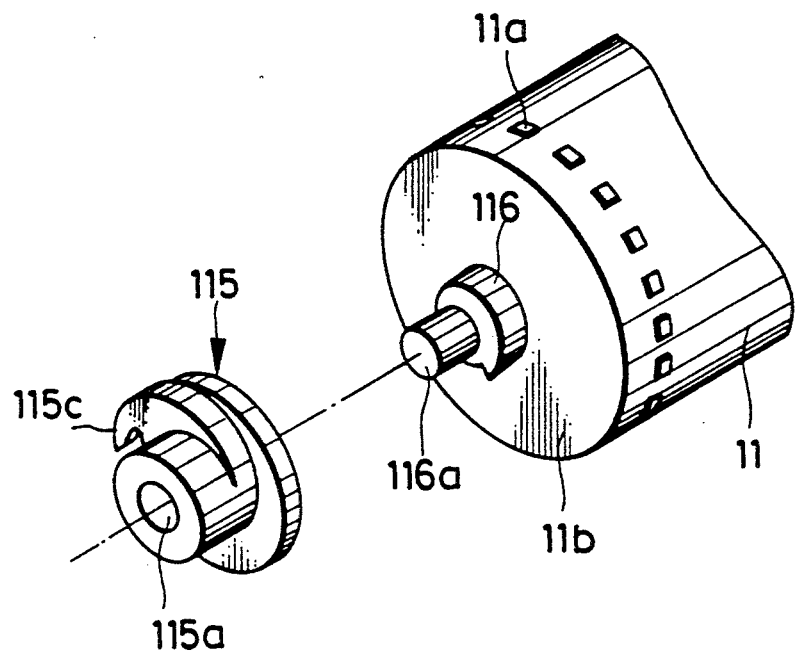
FIG. 8 is a perspective view partially showing an embodiment using a one-way clutch mechanism according to this invention.
Figure 9:
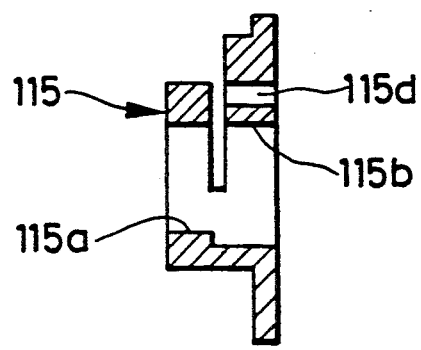
FIG. 9 is a sectional view of the clutch cam shown in FIG. 8.
Figure 10:
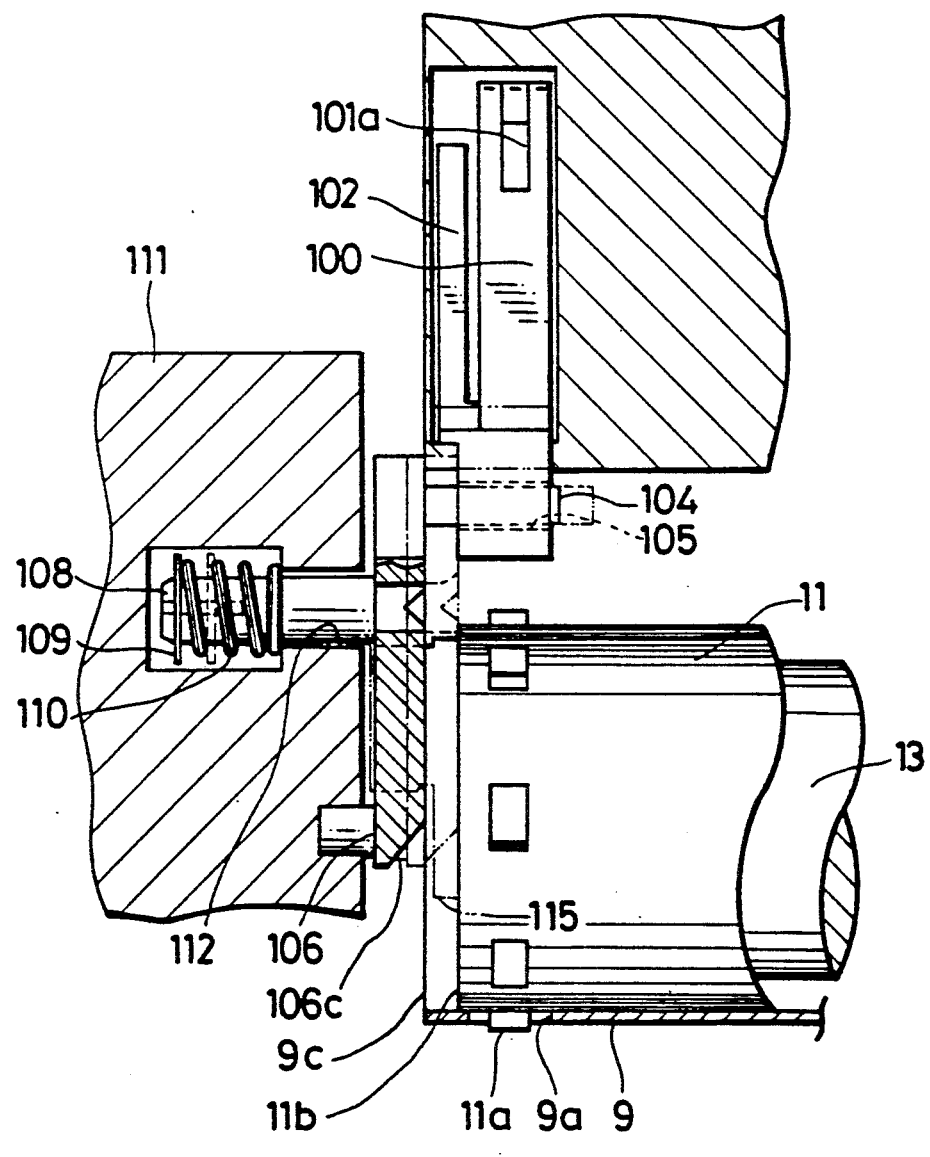
FIG. 10 is a sectional view showing the main part of the embodiment shown in FIG. 8 as viewed from the back door side.
Figure 11A:
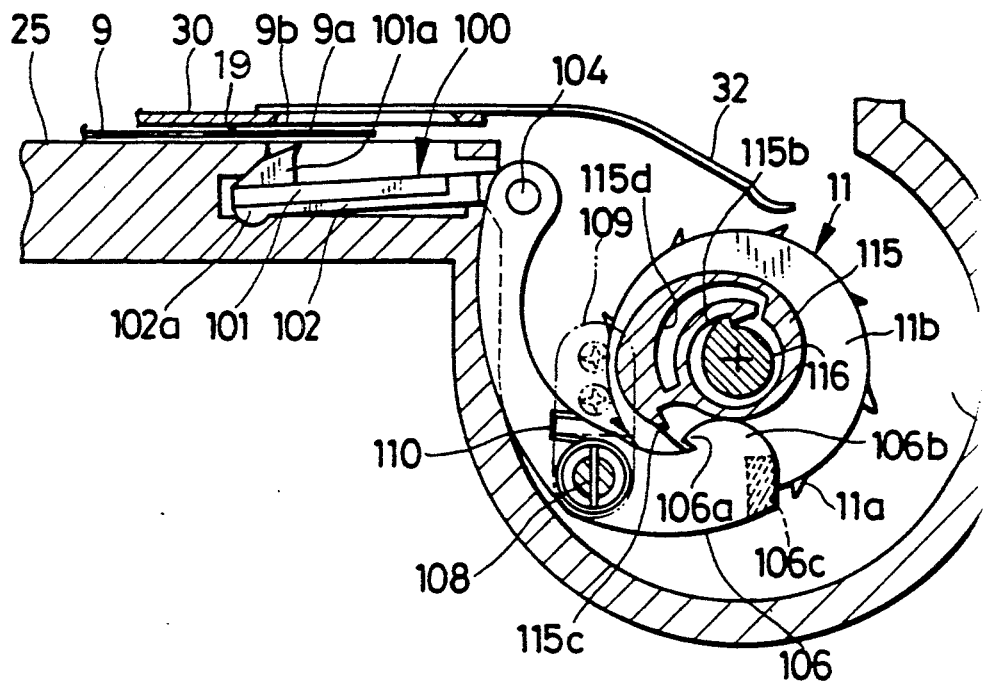
FIGS. 11A to 11D are sectional views illustrating the operation of the embodiment shown in FIG. 8.

FIGS. 8 to 10 and 11A to 11D show a modification of the embodiment shown in FIGS. 6 and 7A to 7C. In this embodiment, a one-way clutch is disposed between the film take-up spool and the drive lever, and the film take-up spool is adapted to be capable of rotating reversely during film rewinding. As shown in FIGS. 8 and 9, a spool cam 116 is integrally formed on the end surface 11b of the film take-up spool 11. This spool cam 116 has a shaft 116a at the center thereof that is rotatably received in a shaft hole 115a of a clutch cam 115. This arrangement constitutes a one-way clutch mechanism. As shown in FIG. 11A, the clutch cam 115 has a clutch lever 115b and an engaging claw 115c integrally molded into the plastic material thereof. The clutch lever 115b has the characteristics of a spring and is elastically deformable within a recess 115d.

As shown in FIG. 10, a shaft 104 fixed to the drive lever 106 is fitted in a shaft hole 105 of the film threading member 100. This film threading member 100 has the same structure as that of the previously described embodiment, so the description thereof is omitted. The drive lever 106 is rotatably mounted on a support 111 via a shaft 108 formed at the center thereof. A coil spring 110 acts between a fastening plate 109 fixed to the camera side wall indicated by the two-dot chain line and the support 111 thereby to bias the drive lever 106 in the counterclockwise direction. The shaft 108 is supported freely movable in the axial direction within a hole 112 formed in the support 111, and the drive lever 106 is also biased in the direction toward the film take-up spool 11 by the coil spring 110. The drive lever 106 has at its distal end a protrusion 106b of arcuate shape with a hook 106a formed thereon. There is also formed on the lower rear surface of the drive lever 106 a tapered portion 106c which is pressed by the side edge 9c of the film leader portion 9b wound about the film take-up spool 11.

The operation of this embodiment will be described with reference to FIGS. 11A to 11D. In the initial stage shown in FIGS. 11A, the claw 101a of the film threading member 100 is positioned under the tapered portion 103 of the camera body 2 so as not to be in contact with the film leader portion 9b. After loading the film, the film take-up spool 11 together with the spool cam 16 is rotated in the clockwise direction by the motor 13. Since the spool cam 116 engages with the clutch lever 115b of the clutch cam 115, they rotate together in the clockwise direction. In this condition, the drive lever 106 is biased in the counterclockwise direction by the coil spring 110 so that the projection 106b is always in contact with the outer periphery of the clutch cam 115. Accordingly, as the clutch cam 115 rotates, the drive lever 106 rotates in the clockwise direction about its shaft 108.

Figure 11B:
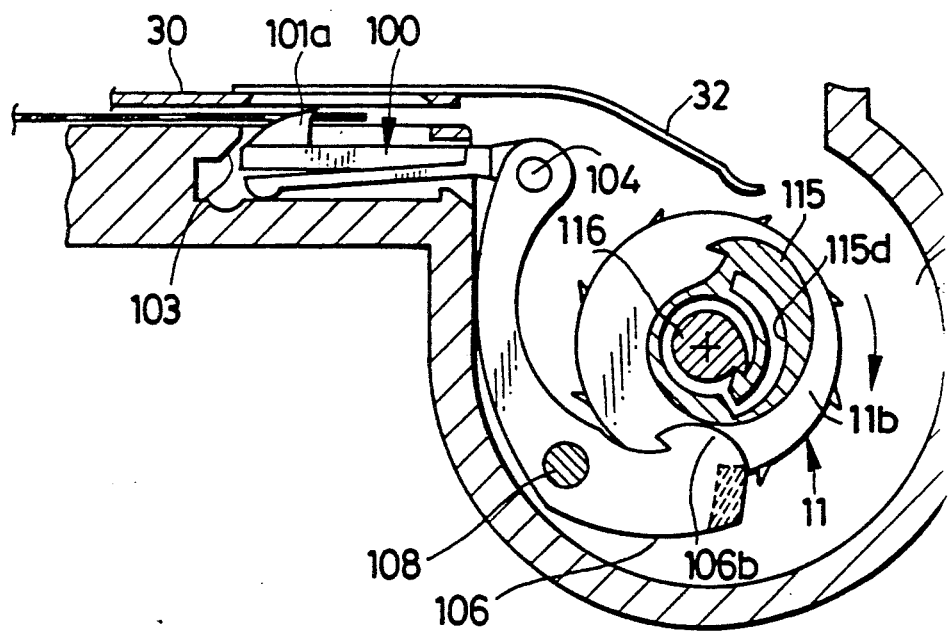
Figure 11C:
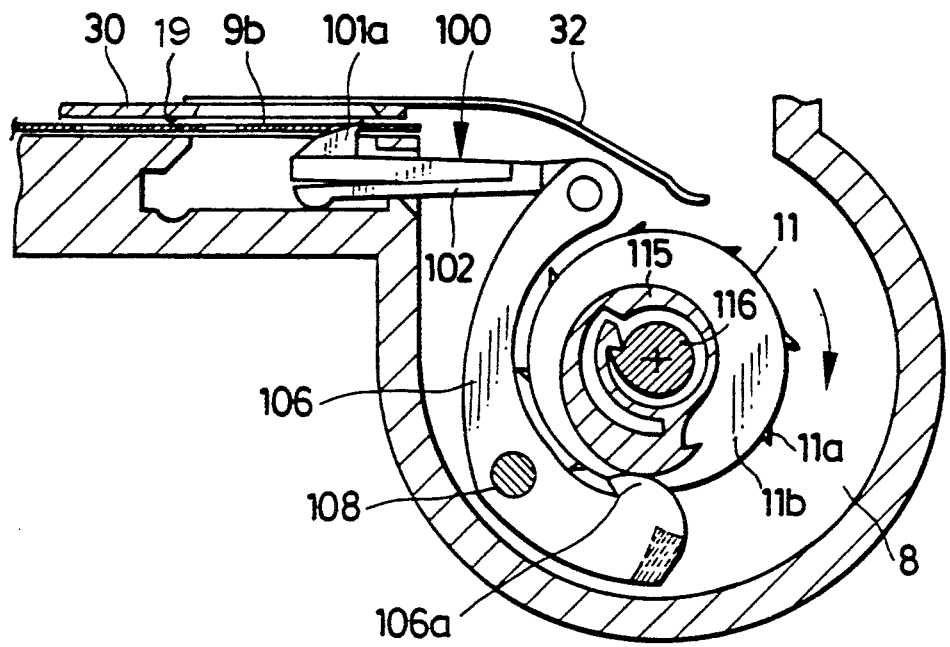

When the drive lever 106 rotates, the film threading member 100 moves toward the film take-up chamber 8. As shown in FIG. 11B, in the earlier stage when the film threading member 100 moves, the claw 101a projects into the film passageway 19 to engage with a perforation 9a. As the clutch cam 115 rotates further, the portion of the clutch cam 115 of the greatest radius contacts a projection 106b as shown in FIG. 11C. At this time, the film threading member 100 is in its position nearest to the film take-up spool 11. As the clutch cam 115 rotates further, the drive lever 106 reaches the portion of the clutch cam 115 of the least radius. At this instant, the drive lever 106 rapidly rotates in the counterclockwise direction due to the force of the spring 110 and returns to the initial position as shown in FIG. 11A. The above operations are repeated and the film leader 9b is intermittently advanced toward the film take-up chamber 8 so that the film leader portion 9b is eventually captured by the outer periphery of the film take-up spool 11.

As the film leader portion 9b is captured by the film take-up spool 11, the side edge 9c of the film leader portion 9b presses against the taped portion 106c. As shown in FIG. 10, the drive lever 106 is caused to move from the position indicated by the two-dot chain line to the position indicated by the solid line against the force of the coil spring 110, so that the drive lever 106 moves to a position wherein the clutch cam 115 cannot engage with it. After the initial film advance, film winding is performed by the film take-up spool 11. During this film winding, the spool cam 104 and the clutch cam 115 rotate together, whereas the drive lever 106 not engaged with the clutch cam 115 remains in the position shown in FIG. 11A.

Figure 11D:
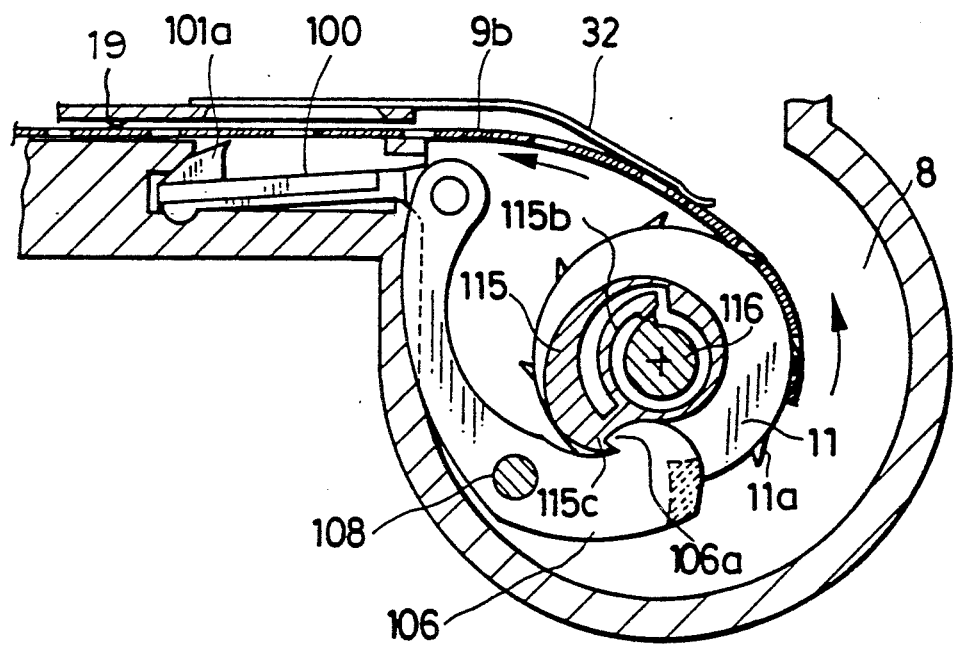
Figure 12:
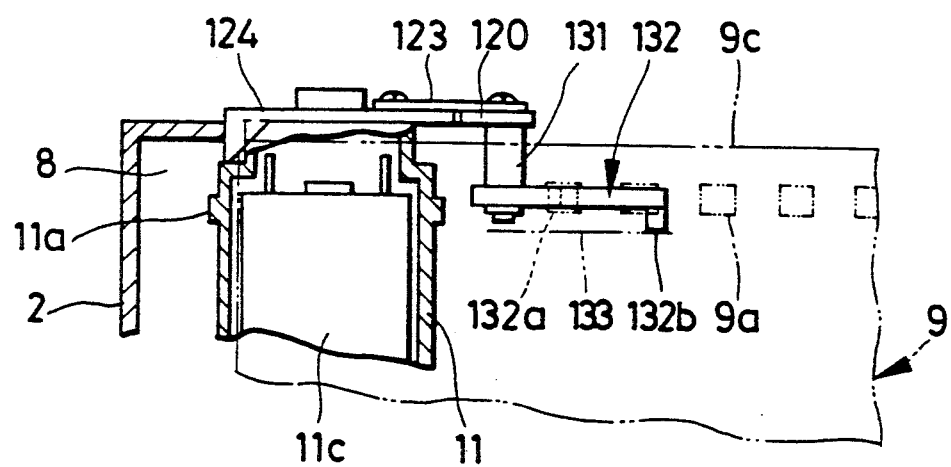
FIG. 12 is a sectional view showing an embodiment of this invention wherein a drive lever is swung by a cam mechanism and a coupling mechanism.

During film rewinding, the spool 12b of the film cassette 10 and the film take-up spool 11 are rotated by the motor 13. Since the rear side of the claw of the spool cam 116 contacts the clutch lever 115b of the cam 115, the spool cam 116 and the clutch cam 115 rotate together in the counterclockwise direction. However, the drive lever 106 is in a position wherein the clutch cam 115 cannot engage therewith so that it remains stationary. When the film leader portion 9b is detached from the film take-up spool 11 in the final stage of film rewinding, the drive lever 106 is moved toward the film take-up spool 11 by the force of the coil spring 110. The hook 106a of the drive lever 106 then engages wit the engaging claw 115c of the clutch cam 115 as illustrated in FIG. 11D. As a result, the clutch cam 115 stops rotating. The spool cam 116 together with the film take-up spool 11 continues to rotate because of the one-way clutch mechanism provided by the spool cam 116 an the clutch cam 115. When the film leader 9b is completely wound into the cassette 12a, or when there still protrudes a predetermined length of the film leader portion 9b, the motor 13 stops to terminate film rewinding.

FIGS. 12 and 13A to 13C show another embodiment of this invention. One end of the drive lever 120 is rotatably supported at the lower end surface of the film take-up chamber 8 by means of a pin 121, and the other end thereof is coupled to the hook lever 124 via a leaf spring 123. A toggle spring 122 has an end 122a secured to a portion of the drive lever 120, and another end 122b bears on the lower end surface of the film take-up chamber 8. The toggle spring 122 has an over-center point between two points shown in FIGS. 13A and 13C. In the position shown in FIG. 13A, the drive lever 120 is biased in the counterclockwise direction, whereas in the position shown in FIG. 13C, it is biased in the clockwise direction.

The hook lever 124 has a hook 125 which is engageable with a protrusion 126a on a spool cam 126 mounted on the film take-up spool 11. As the film take-up spool 11 rotates in the clockwise direction during the film initial advance, the hook lever 124 is caused to move by the spool cam 126 and the drive lever 120 rotates in the clockwise direction about its pin 121. Engagement between the hook lever 124 and the spool cam 126 is released naturally and freely at the position shown in FIG. 13C. The hook lever 124 moves while being guided by a protrusion 127 which is in contact with the inner wall 8a of the film take-up chamber 8.

The drive lever 120 has a cam surface 130 in contact with the protrusion 126a on the spool cam 126. When the cam surface 130 is pressed by the spool cam 126, the drive lever 120 rotates in the counterclockwise direction against the force of the toggle spring 122 and returns to the position shown in FIG. 13C. One end of the film threading member 132 is coupled to the end portion of the drive lever 120 via a pin 131. After the film initial advance, the film threading member 132 is pressed by the film side edge in the direction perpendicular to the drawing sheet of FIG. 13A, and the plate spring 123 is caused to curve so that the hook 125 is retracted from the position wherein the spool cam 126 can engage therewith. The other end of the film threading member 132 is provided with a pin 132b which is fitted in a V-shaped guide groove 133. Reference numeral 132a represents a claw engaging with a perforation 9a.

Figure 13A:
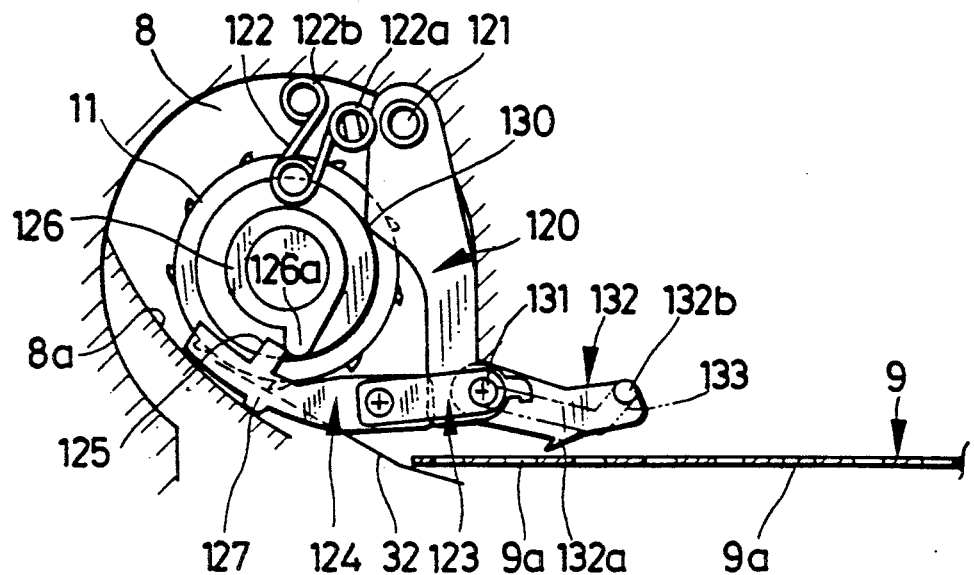
FIGS. 13A to 13C are sectional views illustrating the operation of the embodiment shown in FIG. 12.
Figure 13B:
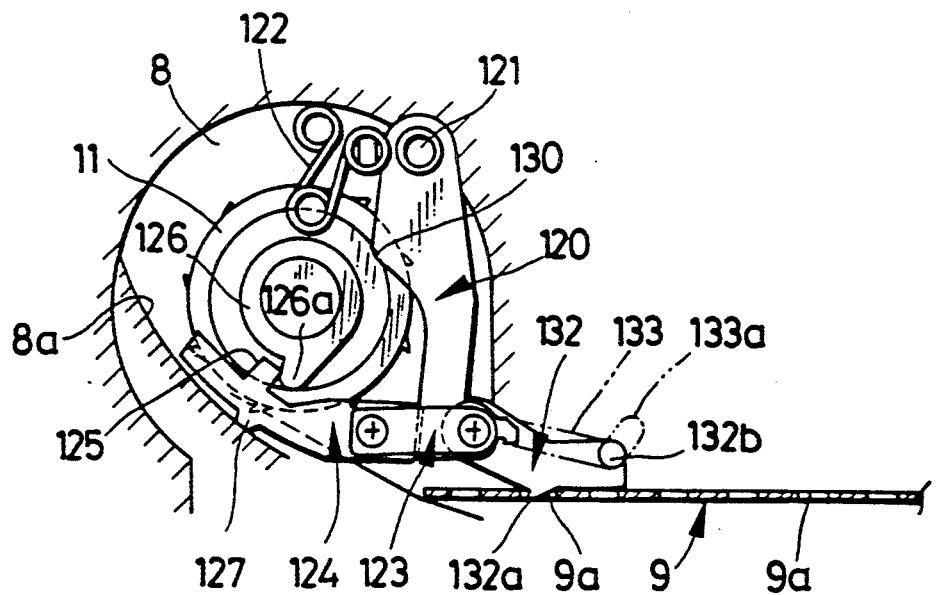

The operation of this embodiment will be described next with reference to FIGS. 13A to 13C. Immediately after loading a film, the claw 132a of the film threading member 132 is retracted from the film passageway 19 as shown in FIG. 13A. As the film take-up spool 11 rotates in the clockwise direction, the projection 126a of the spool cam 126 engages with the hook 125 of the hook lever 124, thereby moving the hook lever 124 along the inner wall 8a. As the hook lever 124 moves, the drive lever 120 rotates in the clockwise direction and the film threading member 132 moves toward the film take-up chamber 8. During the early stages of the motion of the film threading member 132, the pin 132b moves along a portion 133a of the guide groove 133 to reach the position shown in FIG. 13B. In the position shown in FIG. 13B, the claw 132a of the film threading member 132 projects into the film passageway 19 and so can engage with a perforation 9a. The pin 132b of the film threading member 132 is next guided by the portion 133b of the guide groove 133 to move the film threading member 132 to the position shown in FIG. 13C. During this movement, the claw 132a of the film threading member 132 advances the film leader 9b toward the film take-up chamber 8.

Figure 13C:
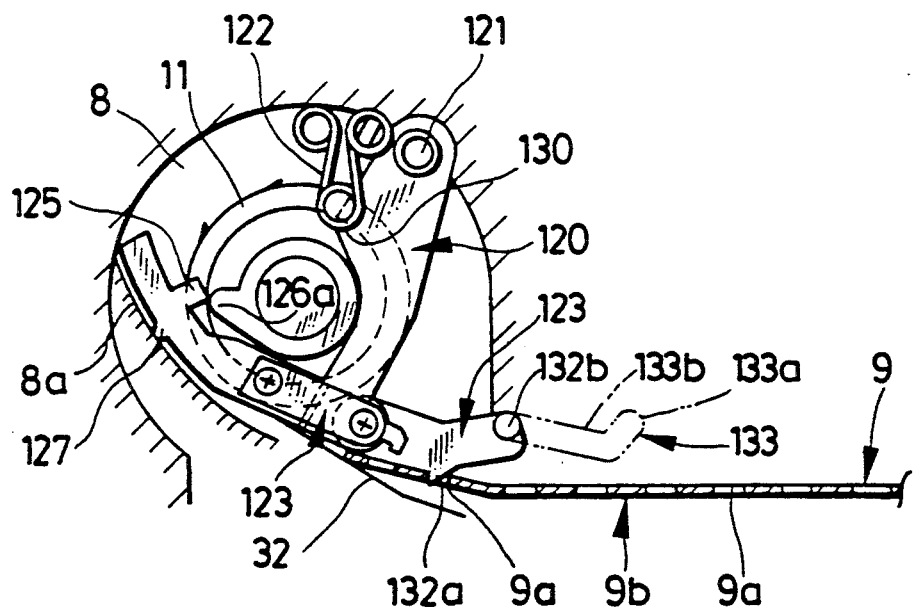
Figure 14:
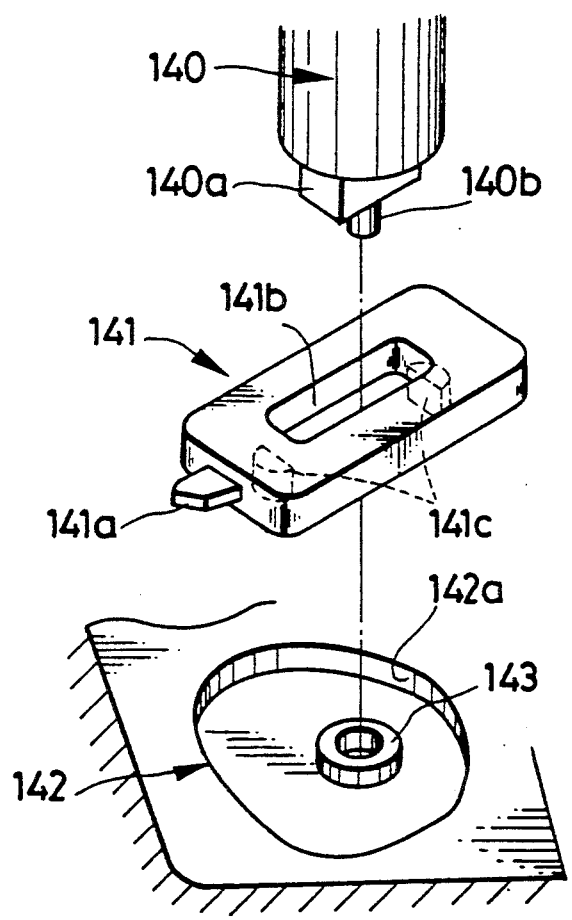
FIG. 14 is an exploded perspective view showing an embodiment of this invention wherein the space for the rotation of a film threading member is reduced.
Figure 15:
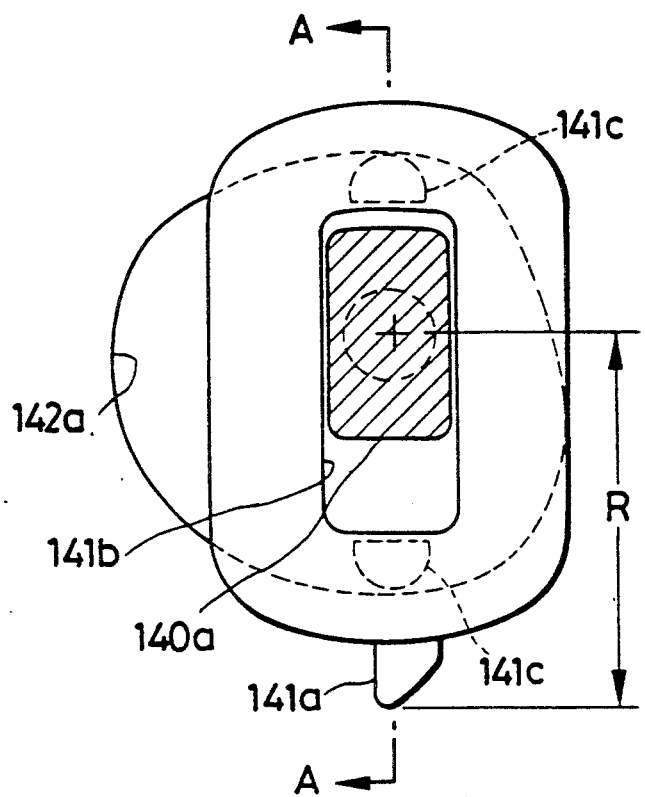
FIG. 15 is a plan view of the embodiment shown in FIG. 8 with the rotary shaft shown in section.

As the film take-up spool 11 rotates to the position shown in FIG. 13C, the spool cam 126 and the hook lever 124 disengage from each other naturally and freely. Since the toggle spring 12 biases the drive lever 120 in the clockwise direction in FIG. 13C, the drive lever 120, the hook lever 124 and the film threading member 132 are held in the position shown in FIGS. 13C. As the film take-up spool 11 rotates further in the clockwise direction, the projection 126a of the spool cam 126 pushes the cam surface 130 of the drive lever 120 so that the drive lever 120 returns via the position shown in FIG. 13B to the position shown in FIG. 13A. In the position shown in FIG. 13A, the drive lever 120 is biased in the counterclockwise direction by the toggle spring 122 so that the film threading member 124 remains retracted from the film passageway 19. In a similar manner, each time the film take-up spool 11 makes one rotation, the film threading member 132 reciprocates between the two positions shown in FIGS. 13A and 13C to thereby intermittently advance the film leader portion 9b toward the film take-up spool 11.

After the film leader portion 9b is captured by the film take-up spool 11, the hook lever 124 is pressed by the film side edge 9c so that the plate spring 123 deforms, and the hook 125 retracts from the space wherein the spool cam 126 can engage therewith. In the meantime, the drive lever 120 is within the space where the spool cam 126 can engage therewith, so that the drive lever 120 is pushed by the spool cam 126 and moved to the position shown in FIG. 13A together with the hook lever 124 and the film threading member 132.

After the film initial advance, the film 9 is wound about the film take-up spool 11 as the latter rotates. During film winding, the film initial-advance apparatus stops in the position shown in FIG. 13A. During film rewinding, although the film 9 causes the film take-up spool 11 to rotate, the film initial advance apparatus remains stationary. When the film leader portion 9b is detached from the film take-up spool 11 at the end of film rewinding, the film take-up spool 11 stops rotating, and the plate spring 123 causes the hook lever 124 to enter the space wherein the spool cam 126 is allowed to be engageable so as to be ready for another film initial advance.

In this embodiment, the hook lever 124 is coupled to the film threading member 132 via the plate spring 123 so that the hook lever 124 can be deformed smoothly when pressed by the film side edge. This deformation is absorbed by the plate spring 123 and so is not transmitted to the film threading member 132, thus allowing a smooth motion of the film threading member 132 without any substantial friction with the margins of the guide groove 133. Furthermore, since the toggle spring 122 is used, even when the hook lever 124 disengages from the spool cam 126, it does not return to its original position at once but remains in its then position until the film take-up spool 11 makes approximately a one half rotation. Accordingly, the film take-up spool 11 can capture the film leader portion 9a reliably. Namely, if the hook lever 124 together with the film threading member 132 restores the original position at once, the film threading member 132 would slightly raise the film leader portion 9b so that the engagement between the capture members 11a of the film take-up spool and perforations 9a would be unstable. In this embodiment, however, after the film take-up spool 11 makes approximately one half rotation, the film threading member 132 begins to return to its original position with the capture members 11a engaging with the perforations 9a, so that the film leader portion 9b can be captured by the capture members 11b reliably.

FIGS. 14 to 17 show another embodiment wherein there is provided a film threading member having a rotary radius sufficiently large for the engagement with a perforation but which at the same time is desirably compact. The film initial-advance apparatus of this embodiment is comprised by a rotary shaft 140, a film threading member 141 and a cam 142. The rotary shaft 140 is formed at its tip with an engaging portion 140a and a shaft portion 140b, and rotates only during the film initial advance.

The film threading member 141 has one claw 141a and so comprises a one-toothed sprocket. There is formed at the center thereof a slot 141b whose longer sides extend in the direction of claw 141a. The engaging portion 140a of the rotary shaft 140 is fitted in the slot 141b. Because of the coaction of the engaging portion 140a and the slot 141b, the film threading member 141 is movable lengthwise of slot 141b.

Figure 16:
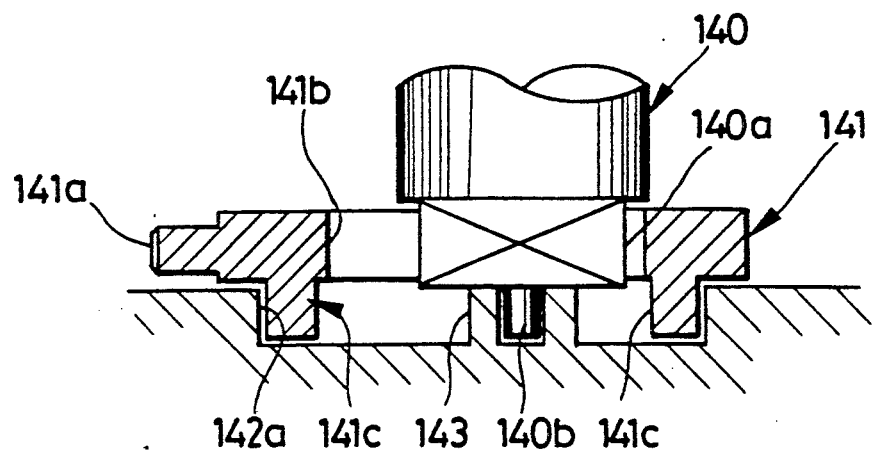
FIG. 16 is a sectional view along line A—A of FIG. 15.

As shown in FIG. 16, two pins 141c slidable on a cam surface 142a of the cam 142 are mounted on the lower surface of the film threading member 141. The cam 142 is formed in the camera body 2 and has a bearing 143 in its central area in which the shaft portion 140b of the rotary shaft 140 is fitted.

The cam 142 guides the pins 141c of the film threading member 141 such that, when the film threading member 141 rotates, it is also caused to slide in the radial direction of the rotary shaft 140. During this sliding of the film threading member 141, the rotary radius of the locus of the claw 141a reaches a maximum value R when it moves in the film passageway 19, and has a small radius elsewhere, as is apparent from FIG. 15. Accordingly, the span over which the claw 141a can engage with a perforation 9a can be made large while keeping to a minimum the space necessary for the rotation of the film threading member 141, at the same time ensuring a smooth engagement/disengagement between the claw 141a and the perforation 9a.

Figure 17:
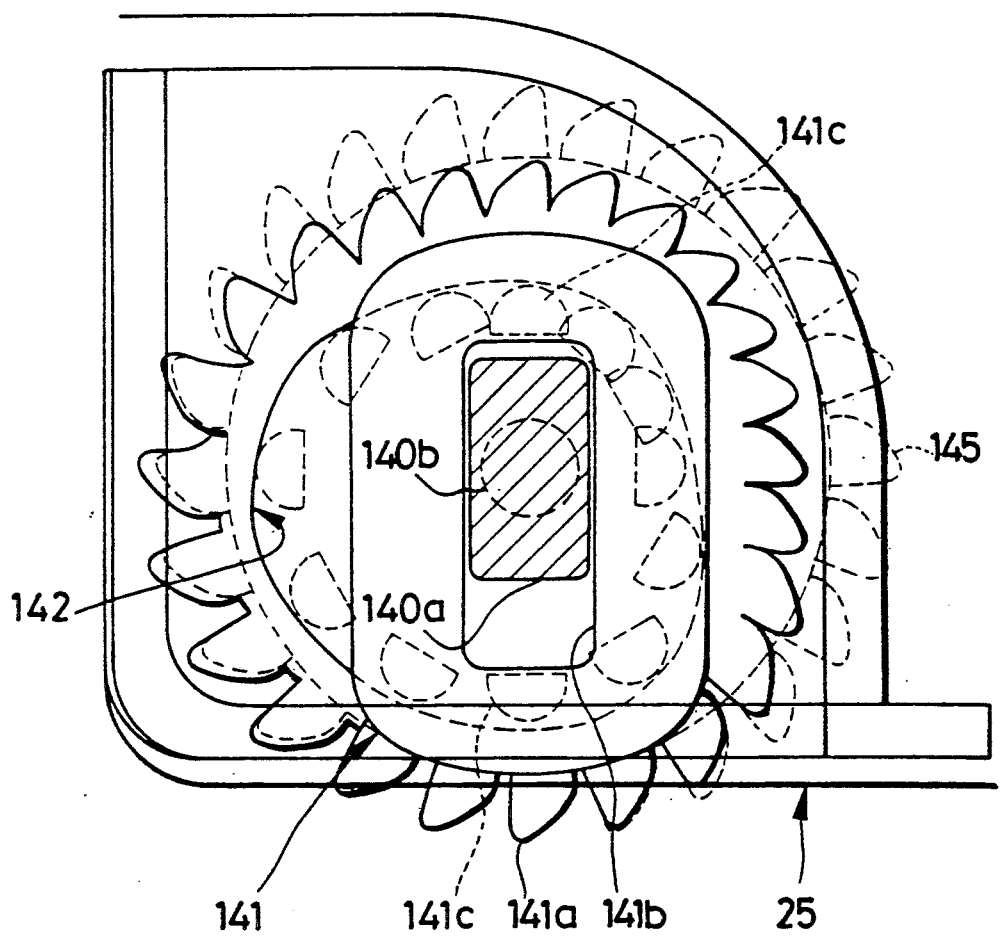
FIG. 17 illustrates the loci of rotation of the film threading members according to the present invention and the prior art.

FIG. 17 shows the locus of the claw 141a according to this embodiment. The locus of a conventional claw is indicated by a broken line for the purpose of comparison. As can e seen from FIG. 17, within the range wherein the claw projects beyond a film guide surface 25 and engages with a perforation, the loci of the claw 141a of this embodiment and a conventional claw 145 are substantially the same. However, within the range wherein the claws are retracted from the film guide surface 25, the claw 141a of this embodiment has a radially inwardly shifted locus compared to the conventional claw 145.

Only one claw is used in this embodiment. However, a plurality of claws may be formed on the film threading member 141 if the shape of the cam 142 is changed. Furthermore, instead of the cam 142 having an inner cam slot, a cam groove may be used. In such a case, a pin engaging with the cam groove is mounted on the film threading member 141.

The present invention is also applicable to a pre-wound type camera in which a film is completely wound about a film take-up spool after the film loading, and is rewound into a cassette each time a frame is exposed. The present invention is applicable not only to a drop-in loading type camera, but also to a conventional camera in which a film cassette is loaded from the back of the camera body by fully opening the back door.

Although the present invention has been described in detail above with reference to preferred embodiments, various changes and modifications within the scope and spirit of the invention will be apparent to those skilled in this technological field. Thus, the invention should be considered as being limited only by the scope of the appended claims.

What is claimed is:

1. A film initial-advance apparatus which advances a film leader portion protruding from a film cassette toward a film take-up spool, comprising:
   a film threading member provided with a claw engageable with a perforation of said film leader portion;
   a driver lever coupled to said film threading member, said drive lever moving between a first position wherein said film threading member is remotest from said film take-up spool and a second position wherein said film threading member is nearest to said film take-up spool;
   hook means for moving said drive lever from said first position to said second position, said hook means engaging with an engaging portion formed on one end surface of said film take-up spool when said engaging portion rotates through a predetermined angle;
   biassing means for returning said drive lever to said first position when said hook means disengages from said engaging portion; and
   engagement releasing means for preventing said hook means from being engaged with said engaging portion after said film leader portion is captured by the outer periphery of said film take-up spool.

2. A film initial-advance apparatus according to claim 1, wherein said engagement releasing means retracts said hook means, from a position wherein said engaging portion can engage with said hook means, by means of pressure applied by the side edge of said film leader portion captured by said film take-up spool.

3. A film initial-advance apparatus according to claim 1, wherein said drive lever and said hook means are a single lever of arcuate shape.

4. A film initial-advance apparatus according to claim 1, further comprising a release member for temporarily releasing engagement between said hook means and said engaging portion by contacting a tip of said hook leer when said drive lever rotates through a predetermined angle.

5. A film initial-advance apparatus according to claim 1, wherein said hook means is rotatably supported on said drive lever, and said hook means disengages from said engaging portion when said engaging portion moves through a predetermined angle.

6. A film initial-advance apparatus which advances a film leader portion protruding from a film cassette toward a film take-up spool, comprising:
   a film threading member provided with an engaging portion engageable with a perforation of said film leader portion;
   an eccentric protrusion on one end of said film take-up spool; and
   a driver lever swingable upon abutment with aid protrusion for intermittently and reciprocally moving said film threading member with back-and-forth movement in the direction of transporting said film leader portion.

7. A film initial-advance apparatus according to claim 6, further comprising engagement releasing means for releasing the engagement between said drive lever and said protrusion by pressure applied by the side edge of said film leader portion after said film leader portion is captured by said film take-up spool 8. A film initial-advance apparatus comprising:
   a film threading member for advancing a film leader portion producing from a film cassette toward a film take-up spool, said film threading member having a claw engageable with a perforation of said film leader portion;
   driving means for reciprocally moving said film threading member with back-and-forth movement in the direction of advance of said film leader portion as said film take-up spool rotates;
   means for guiding said film threading member, said guiding means causing said claw to move from an initial position wherein said claw is retracted from a film passageway to a position wherein said claw projects into said film passageway, when said claw moves toward said film take-up spool, and causing said claw to move along said film passageway with said claw projecting into said film passageway; and
   means for stopping the reciprocal motion of said film threading member after said film leader portion is captured by the outer periphery of said film take-up spool;
   wherein the reciprocal motion of said film threading member is carried out intermittently so that said film leader portion can be reliably captured by said film take-up spool; and
   wherein said driving means includes a coupling mechanism and a return member, said coupling mechanism connecting to said film take-up spool only during the rotation of said film take-up spool through a predetermined angle within one rotation and moving said film threading member to a position nearest to said film take-up spool, and said return member causing said film threading member to return to said initial position after said coupling mechanism is disconnected from said film take-up spool.

9. A film initial-advance apparatus according to claim 8, wherein said return member is a spring.

10. A film initial-advance apparatus according to claim 8, wherein said return member is a lever coupled to said film threading member and adapted to be pressed by a portion of said film take-up spool.

11. A film initial-advance apparatus comprising:
   a film threading member for advancing a film leader portion protruding from a film cassette toward a film take-up spool, said film threading member having a claw engageable with a perforation of said film leader portion;

driving means for reciprocally moving said film threading member with back-and-forth movement in the direction of advance of said film leader portion as said film take-up spool rotates;

means for guiding said film threading member, said guiding means causing said claw to move from an initial position wherein said claw is retracted from a film passageway to a position wherein said claw projects into said film passageway, when said claw moves toward said film take-up spool, and causing said claw to move along said film passageway with said claw protecting into said film passageway; and means for stopping the reciprocal motion of said film threading member after said film leader portion is captured by the outer periphery of said film take-up spool;

wherein said means for stopping the reciprocal motion inactivates said driving means by detecting the side edge of said film leader portion captured by said film take-up spool.

12. A film initial-advance apparatus comprising:

a film threading member for advancing a film leader portion protruding from a film cassette toward a film take-up spool, said film threading member having a claw engageable with a perforation of said film leader portion;

driving means for reciprocally moving said film threading member with back-and-forth movement in the direction of advance of said film leader portion as said film take-up spool rotates;

means for guiding said film threading member, said guiding means causing said claw to move from an initial position wherein said claw is retracted from a film passageway to a position wherein said claw projects into said film passageway, when said claw moves toward said film take-up spool, and causing said claw to move along said film passageway with said claw projecting into said film passageway; and means for stopping the reciprocal motion of said film threading member after said film leader portion is captured by the outer periphery of said film take-up spool;

wherein said driving means comprises a drive leer coupled to said film threading member, a cam mechanism for intermittently coupling said drive lever to said film take-up spool to move said drive lever such that said film threading member moves near to said film take-up spool, and means for biasing said film threading member in the direction of leaving said film take-up spool.

13. A film initial-advance apparatus according to claim 12, wherein said means for stopping the reciprocal motion inactivates said driving means by detecting the side edge of said film leader portion captured by said film take-up spool.

* * * * *